US009435301B2

(12) United States Patent
Tani et al.

(10) Patent No.: US 9,435,301 B2
(45) Date of Patent: Sep. 6, 2016

(54) TUBULAR MOLDED FOAM WITH PLATE PORTION

(75) Inventors: Naoto Tani, Nagoya (JP); Masayuki Mishima, Nagoya (JP); Isao Kimura, Nagoya (JP)

(73) Assignee: KYORAKU CO., LTD., Kyoto (JP)

( * ) Notice: Subject to any disclaimer, the term of this patent is extended or adjusted under 35 U.S.C. 154(b) by 297 days.

(21) Appl. No.: 13/559,050

(22) Filed: Jul. 26, 2012

(65) Prior Publication Data

US 2013/0052377 A1 Feb. 28, 2013

(30) Foreign Application Priority Data

Aug. 31, 2011 (JP) .................................. 2011-188855

(51) Int. Cl.
B29D 22/00 (2006.01)
F02M 35/10 (2006.01)
F02M 35/112 (2006.01)
(Continued)

(52) U.S. Cl.
CPC ...... *F02M 35/10334* (2013.01); *B29C 47/369* (2013.01); *B29C 49/0005* (2013.01); *B29C 49/48* (2013.01); *B29C 49/66* (2013.01); *F02M 35/10347* (2013.01); *F02M 35/112* (2013.01); *F16L 9/21* (2013.01); *F16L 43/02* (2013.01); *B29C 47/004* (2013.01); *B29C 47/0019* (2013.01); *B29C 47/0023* (2013.01); *B29C 47/0054* (2013.01); *B29C 47/165* (2013.01); *B29C 47/54* (2013.01); *B29C 49/04* (2013.01); *B29C 49/041* (2013.01); *B29C 49/62* (2013.01); *B29C 49/783* (2013.01); *B29C 49/786* (2013.01); *B29C 2049/0057* (2013.01); *B29C 2049/047* (2013.01); *B29C 2049/4805* (2013.01); *B29C 2049/609* (2013.01); *B29C 2049/6063* (2013.01); *B29C 2049/6072* (2013.01); *B29C 2049/6607* (2013.01); *B29C 2793/0054* (2013.01); *B29K 2105/04* (2013.01); *B29L 2023/004* (2013.01); *B29L 2031/24* (2013.01);
(Continued)

(58) Field of Classification Search
CPC .................. B29C 2049/0057; B29C 47/0023; B29C 49/0005; B29C 49/48; B29C 49/66; B29C 47/369; B29K 2105/04; F02M 35/10334; F02M 35/10347; F02M 35/112; Y10T 428/13; B29L 2031/24; F16L 9/21; F16L 43/02
USPC ................................................. 428/34.1, 36.5
See application file for complete search history.

(56) References Cited

U.S. PATENT DOCUMENTS 4,387,268 A * 6/1983 Morel et al. ...................... 174/92
6,318,102 B1 * 11/2001 Asou et al. ...................... 62/244

FOREIGN PATENT DOCUMENTS

JP 2001-201160 7/2001
JP 2011-131776 7/2011

OTHER PUBLICATIONS

Machine Translation of JP 2001-201160 A; Takahashi; 2001.*
(Continued)

*Primary Examiner* — James Yager
(74) *Attorney, Agent, or Firm* — Greenblum & Bernstein, P.L.C.

(57) ABSTRACT

Provided is a tubular molded foam with a plate portion capable of reliably preventing the occurrence of an unwanted lump on the inside of a tube body even when the molding is manufactured using a molten resin having a high expansion ratio. The tubular molded foam includes a tube body and a plate portion joined with an outside of the tube body. The plate portion has a recess in the vicinity of a joint surface with the tube body.

18 Claims, 18 Drawing Sheets

(51) Int. Cl.
  *B29C 49/00* (2006.01)
  *B29C 49/48* (2006.01)
  *B29C 49/66* (2006.01)
  *B29C 47/36* (2006.01)
  *F16L 9/21* (2006.01)
  *F16L 43/02* (2006.01)
  *B29C 49/04* (2006.01)
  *B29L 31/00* (2006.01)
  *B29L 31/24* (2006.01)
  *B29L 31/60* (2006.01)
  *B29C 47/00* (2006.01)
  *B29C 47/16* (2006.01)
  *B29C 47/54* (2006.01)
  *B29K 105/04* (2006.01)
  *B29C 49/62* (2006.01)
  *B29C 49/78* (2006.01)
  *B29C 49/60* (2006.01)
  *B29L 23/00* (2006.01)

(52) U.S. Cl.
  CPC . *B29L 2031/602* (2013.01); *B29L 2031/7492* (2013.01); *Y10T 428/13* (2015.01)

(56) References Cited

OTHER PUBLICATIONS

Japanese Official Action of Jul. 9, 2013.

\* cited by examiner

TUBULAR MOLDED FOAM WITH PLATE PORTION

CROSS REFERENCE TO RELATED APPLICATION

This application is based on Japanese Patent Application No. 2011-188855 filed with the Japan Patent Office on Aug. 31, 2011, the entire content of which is hereby incorporated by reference.

TECHNICAL FIELD

The present disclosure relates to a tubular molded foam having a plate portion (for example, a flange portion for connecting to another member) joined with a tube body.

BACKGROUND ART

In ducts, for example, molded foam provided with a flange portion for connecting to another tubular member in the vicinity of an opening of the tube body is widely used.

In particular, as for a duct for allowing the air from an air conditioner to breeze, a light-weight duct having excellent thermal insulating properties can be achieved by using a tubular molded foam. Further, in such a duct using the tubular molded foam, the thermal insulating properties and light-weight of the duct can be further improved by increasing the expansion ratio during manufacturing to increase the number of foams within the foam. Accordingly, the use of the tubular molded foam is more effective.

As a method for manufacturing the molded foam, a method of forming a molded foam by clamping a molten resin with a split mold block is well known. In recent years, mass production of tubular foam having an improved expansion ratio is becoming possible along with the improvement in molding techniques.

Additionally, as a technique for which an application was previously filed by the applicant of this application, there is a technique for manufacturing a molded product having a tubular portion and a plate portion, by clamping a resin sheet formed of foamed resin and a resin sheet formed of solid resin with a split mold block (for example, see Patent Literature 1).

Patent Literature 1: Japanese Patent Application Laid-Open No. 2011-131776

SUMMARY OF THE INVENTION

Technical Problem

However, in the case of providing a flange portion to the duct described above, for example, a predetermined structural strength is required in many cases. For example, as shown in FIG. 18, in the case of joining a plate portion Y8 with a tube body X8, this plate portion Y8 is required to have a predetermined structural strength to reliably connect to another member at the flange portion.

Here, as described above, in the case of increasing the expansion ratio of the formed resin P8 and increasing the structural strength of the plate portion Y8 during manufacturing of the tubular foam, the foams within the foamed resin P8 have been crashed by pressing the plate portion Y8 during clamping with the split mold block.

In this case, the plate portion Y8 is joined with the tube body X8, and a space is formed inside the tube body X8. Accordingly, when the foamed resin P8 having a high expansion ratio is strongly pressed by the plate portion Y8, the foams within the formed resin P8 in contact with the plate portion Y8 move toward the space of the tube body X8 by a pressing force Z generated due to clamping. Thus, the inventors have found that as a result of clamping with the split mold block, the foamed resin P8 is raised by the moved foams in the space within the tube body X8, which may generate a lump 81.

When the lump 81 is generated due to the foams as described above, the inside shape of the tube body X8 becomes a different shape from the designed shape. Thus, when the inside shape becomes a different shape from the designed shape, there is a possibility that the flow efficiency of a fluid passing through the tube body X8 is lowered.

For example, there is a problem that allophone and vibration may be caused depending on the speed of gas passing through the tube body X8. There is another problem that the allophone and vibration are further increased when defoaming occurs due to coarsening of the foams in the lump 81.

In the technique disclosed in Patent Literature 1 described above, the problem to be caused by movement of forms within the foamed resin has not been taken into consideration.

An embodiment of the present disclosure has been made in view of the above-mentioned circumstances, and an object of the present disclosure is to provide a tubular molded foam with a plate portion capable of reliably preventing the generation of an unwanted lump on the inside of a tube body even in the case of manufacturing the molding using a molten resin having a high expansion ratio.

Solution to Problem

In order to achieve the purpose described above, a tubular molded foam with a plate portion according to an embodiment of the present disclosure includes a tube body and a plate portion joined with an outside of the tube body. The plate portion has a recess in the vicinity of a joint surface with the tube body.

Advantageous Effects of Invention

As described above, according to an embodiment of the present disclosure, it is possible to reliably prevent the generation of an unwanted lump on the inside of a tube body even in the case of manufacturing the molding using a molten resin having a high expansion ratio.

DESCRIPTION OF THE EMBODIMENTS

Figure 1:
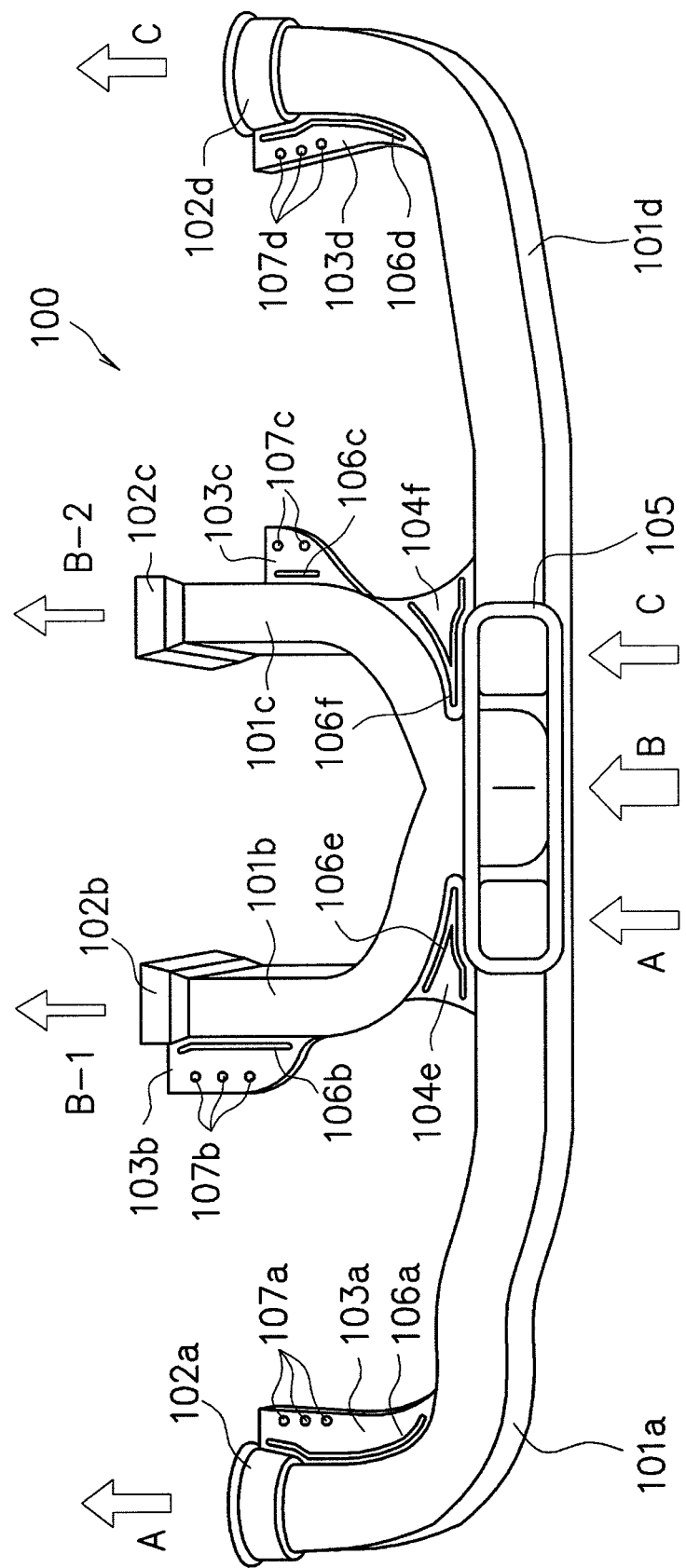
FIG. 1 is an appearance perspective view for explaining a schematic configuration of a tubular molded foam according to an embodiment of the present disclosure.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Next, a tubular molded foam with a plate portion according to an embodiment of the present disclosure will be described in detail with reference to the drawings.

<Configuration Example of Tubular Molded Foam 100>

Figure 2:
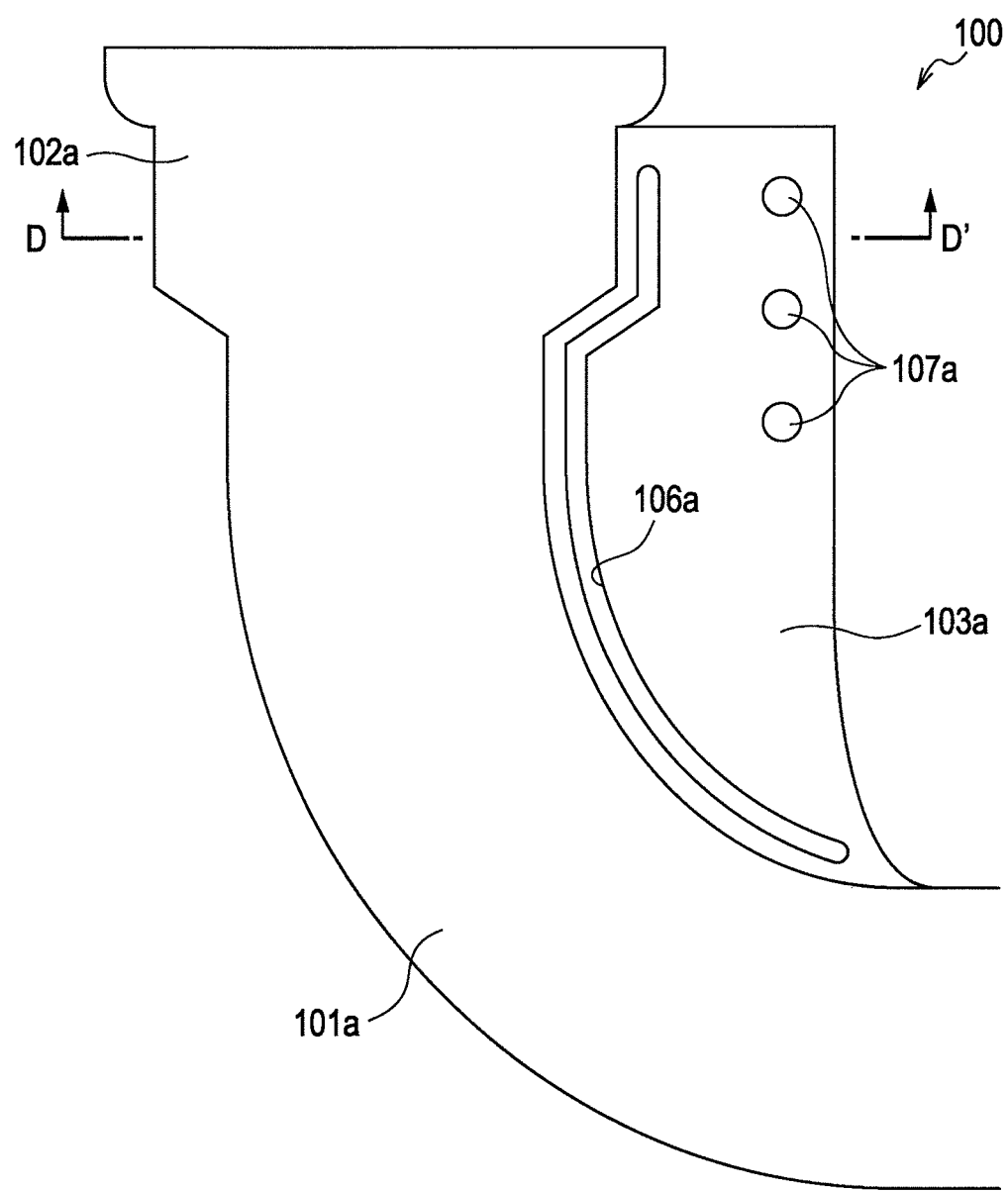
FIG. 2 is a plan view for explaining the vicinity of a fitting portion of the tubular molded foam.
Figure 3:
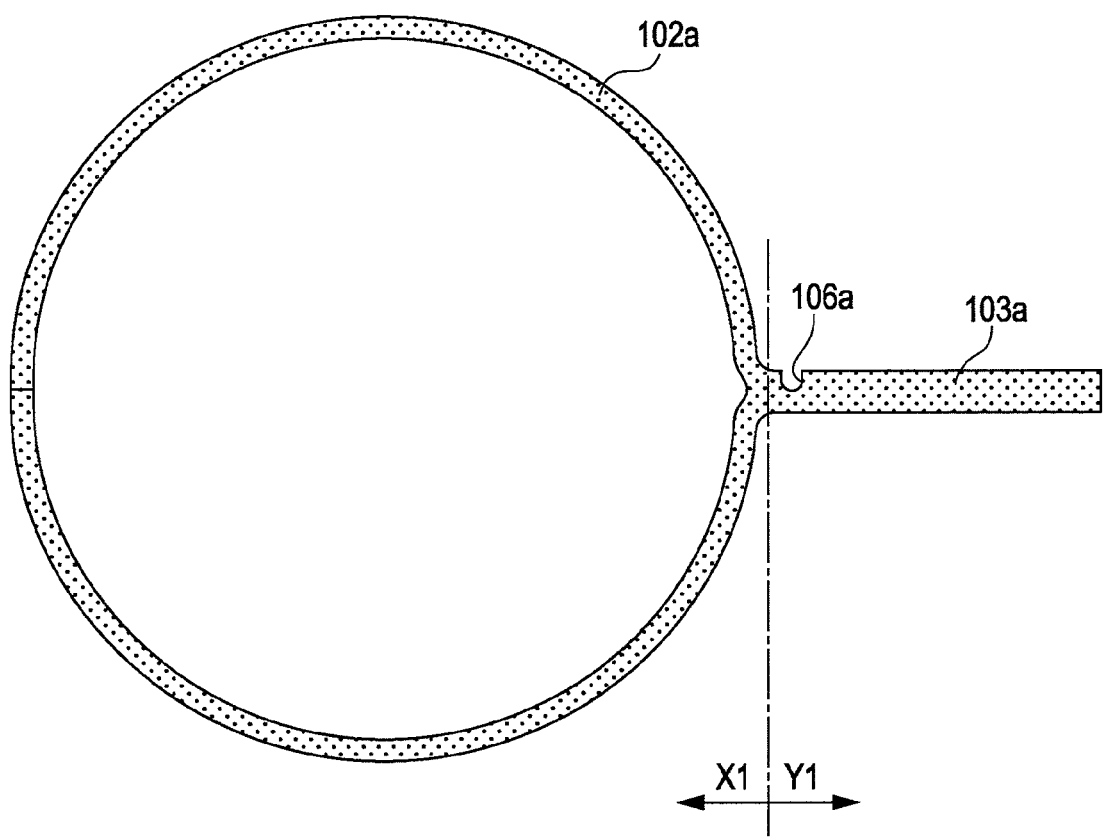
FIG. 3 is a sectional view taken along D-D' line of FIG. 2.

Referring first to FIGS. 1 to 3, a configuration example of a tubular molded foam 100 according to this embodiment will be described. FIG. 1 is an overall perspective view for explaining a schematic configuration of the tubular molded foam 100 according to an embodiment of the present disclosure. FIG. 2 is a plan view showing the vicinity of a fitting portion 102a of the tubular molded foam 100. FIG. 3 is a cross-sectional view taken along line D-D' of FIG. 2.

The tubular molded foam 100 of this embodiment is a light-weight member used for circulating cool or warm air supplied from an air conditioner unit, for example, to a desired portion. The tubular molded foam 100 is formed by clamping a thermoplastic resin having a foaming agent mixed therein and by performing blow molding.

As shown in FIG. 1, the tubular molded foam 100 has a configuration in which a tube body X1 and flange portions 103 (103a to d) are joined together. The tube body X1 includes a tube portion 101 and a supply port 105 formed at one end of the tube portion 101. The tube portion 101 includes a plurality of tube portions 101a to 101d. These tube portions 101a to 101d are opened at one end thereof to the supply port 105. This supply port 105 is an opening for connecting the tube portion 101 and an air conditioner unit (not shown). Furthermore, the other ends of the tube portions 101 (101a to 101d) are respectively provided with fitting portions 102 (102a to 102d).

The tube body X1 is formed of a closed cell structure (closed cell content of 70% or more) including a plurality of foamed cells at a 2.5-fold expansion ratio or more. The average cell diameter of each foamed cell in the thickness direction of the tube body X1 is less than 300 µm, preferably, less than 100 µm.

The inside of the tube body X1 is provided with a channel for circulating a fluid. The cool or warm air of the air conditioner unit can be circulated within this channel.

In the tubular molded foam 100 of this embodiment, the above-mentioned channel is formed as described below. That is, the channel of the fluid supplied from the supply port 105 is divided into four channels A, B-1, B-2, and C passing through the tube portions 101a to 101d, respectively, as shown in FIG. 1. The fluid supplied from the supply port 105 is flown out from the opening of the fitting portion 102a in the channel A. The fluid is flown out from the opening of the fitting portion 102b in the channel B-1. The fluid is flown out from the opening of the fitting portion 102c in the channel B-2. The fluid is flown out from the opening of the fitting portion 102d in the channel C.

Here, constitutional members provided around the channel A of the tubular molded foam 100 will be described. The channel A includes the tube portion 101a, the supply port 105 formed at one end of the tube portion 101a, and the fitting portion 102a provided at the other end of the tube portion 101a. As shown in FIG. 1, the flange portion 103a is provided on a peripheral surface in the vicinity of the fitting portion 102a of the tube portion 101a. This flange portion 103a forms a part of the tube body X1 together with the tube portion 101a. A recessed groove 106a (recess) is formed in the vicinity of a joint surface between the flange portion 103a and the tube portion 101a.

The flange portion 103a includes a plurality of fixing holes 107a. These fixing holes 107a are used to fix another tubular member to be connected to the tube portion 101a through the fitting portion 102a. Specifically, bolts (not shown) are allowed to penetrate through the fixing holes 107a and fastened with nuts, thereby making it possible to fix the tubular molded foam 100 to another tubular member to be connected.

The constitutional members provided around the channel B-1 of the tubular molded foam 100 will be described. The channel B-1 includes the tube portion 101b, the supply port 105 formed at one end of the tube portion 101b, and the fitting portion 102b formed at the other end of the tube portion 101b. As shown in FIG. 1, the flange portion 103b is provided on a peripheral surface in the vicinity of the fitting portion 102b of the tube portion 101b. This flange portion 103b forms a part of the tube body X1 together with the tube portion 101b. Further, a recessed groove 106b (recess) is formed in the vicinity of the joint surface between the flange portion 103b and the tube portion 101b.

The flange portion 103b includes a plurality of fixing holes 107b. These fixing holes 107b are used to fix another tubular member to be connected to the tube portion 101b through the fitting portion 102b. Specifically, bolts (not shown) are allowed to penetrate through the fixing holes 107b and fastened with nuts, thereby making it possible to fix the tubular molded foam 100 to another tubular member to be connected.

The tube portion 101a and the tube portion 101b are formed in a shape branched from the supply port 105. Accordingly, in the vicinity of the supply port 105, the distance between the tube portion 101a and the tube portion 101b is small. In this embodiment, a bridge portion 104e for holding the strength is provided in this portion. Specifically, the bridge portion 104e is formed to be joined with the tube portion 101a and the tube portion 101b. The joint surface between the tube portion 101a and the tube portion 101b of the bridge portion 104e has a recessed groove 106e formed therein.

The constitutional members provided around the channel B-2 of the tubular molded foam 100 will be described. The channel B-2 includes the tube portion 101c, the supply port 105 formed at one end of the tube portion 101c, and the fitting portion 102c provided at the other end of the tube portion 101c. As shown in FIG. 1, the flange portion 103c is provided on a peripheral surface in the vicinity of the fitting portion 102c of the tube portion 101c. This flange portion 103c forms a part of the tube body X1 together with the tube portion 101c. A recessed groove 106c is formed in the vicinity of the joint surface between the flange portion 103c and the tube portion 101c.

The flange portion 103c has a plurality of fixing holes 107c. These fixing holes 107c are used to fix another tubular member to be connected to the tube portion 101a through the fitting portion 102c. Specifically, bolts (not shown) are allowed to penetrate through the fixing holes 107c and fastened with nuts, thereby making it possible to fix the tubular molded foam 100 to another tubular member to be connected.

The tube portion 101c and the tube portion 101d are formed in a shape branched from the supply port 105. Accordingly, in the vicinity of the supply port 105, the distance between the tube portion 101c and the tube portion 101d is small. Accordingly, a bridge portion 104f for holding the strength is also provided in this portion. Specifically, the bridge portion 104f is provided to be joined with the tube portion 101c and the tube portion 101d. The joint surface between the tube portion 101c and the tube portion 101d in the bridge portion 104f has a recessed groove 106f formed therein.

The constitutional members provided around the channel C of the tubular molded foam 100 will be described. The channel C includes the tube portion 101d, the supply port 105 formed at one end of the tube portion 101d, and the fitting portion 102d provided at the other end of the tube portion 101d. As shown in FIG. 1, the flange portion 103d is provided on a peripheral surface in the vicinity of the fitting portion 102d of the tube portion 101d. A recessed groove 106d is formed in the vicinity of the joint surface between the flange portion 103d and the tube portion 101c.

The flange portion 103d has a plurality of fixing holes 107d. These fixing holes 107d are used to fix another tubular member to be connected to the tube portion 101d through the fitting portion 102d. Specifically, bolts (not shown) are allowed to penetrate through the fixing holes 107d and fastened with nuts, thereby making it possible to fix the tubular molded foam 100 to another tubular member to be connected.

As shown in FIGS. 2 and 3, the recessed grooves 106, which are formed in the flange portions 103 (103a to 103d) and the bridge portions 104 (104e, 104f), are formed in a shape along the joint surface in the vicinity of the joint surface between a plate portion Y1 (corresponding to the flange portion 103 and the bridge portion 104) and the tube body X1. In this case, however, the recessed grooves 106 are not formed in the vicinity of an edge portion of the plate portion Y1, and are formed at positions other than the vicinity of the edge portion. Thus, the recessed grooves 106 are not formed in the vicinity of the edge portion, thereby providing the same thickness as that of the other portions. Accordingly, the structural strength of the plate portion Y1 can be sufficiently ensured even when the recessed grooves 106 are formed.

The tubular molded foam 100 of this embodiment is made of a polypropylene-based resin. Preferably, the tubular molded foam 100 is made of a blend resin obtained by mixing 1 to 20 wt % of polyethylene-based resin and/or 5 to 40 wt % of hydrogenated styrene-based thermoplastic elastomer. The tubular molded foam 100 preferably has a tensile fracture elongation of 40% or more at −10° C., and a tensile elastic modulus of 1000 kg/cm$^2$ or more at room temperature. Furthermore, the tubular molded foam 100 preferably has a tensile fracture elongation of 100% or more at −10° C.

The terms used in this embodiment are defined below.

Expansion ratio: An expansion ratio is a value obtained by dividing the density of thermoplastic resin used for the manufacturing method of this embodiment, which is described later, by the apparent density in the tube body X1 of the tubular molded foam 100, which is obtained by the manufacturing method of this embodiment.

Tensile fracture elongation: A tensile fracture elongation is a value obtained by cutting out the tube body X1 of the tubular molded foam 100 obtained by the manufacturing method of this embodiment, which is described later, and by measuring a tension speed at 50 mm/min as a No. 2 test piece in accordance with JIS K-7113 after storage at −10° C.

Tensile elastic modulus: A tensile elastic modulus is a value obtained by cutting out the tube body X1 of the tubular molded foam 100 obtained by the manufacturing method of this embodiment, which is described later, and by measuring a tension speed at 50 mm/min as a No. 2 test piece in accordance with JIS K-7113 at room temperature (23° C.).

<Example of Method of Manufacturing Tubular Molded Foam 100>

Figure 4:
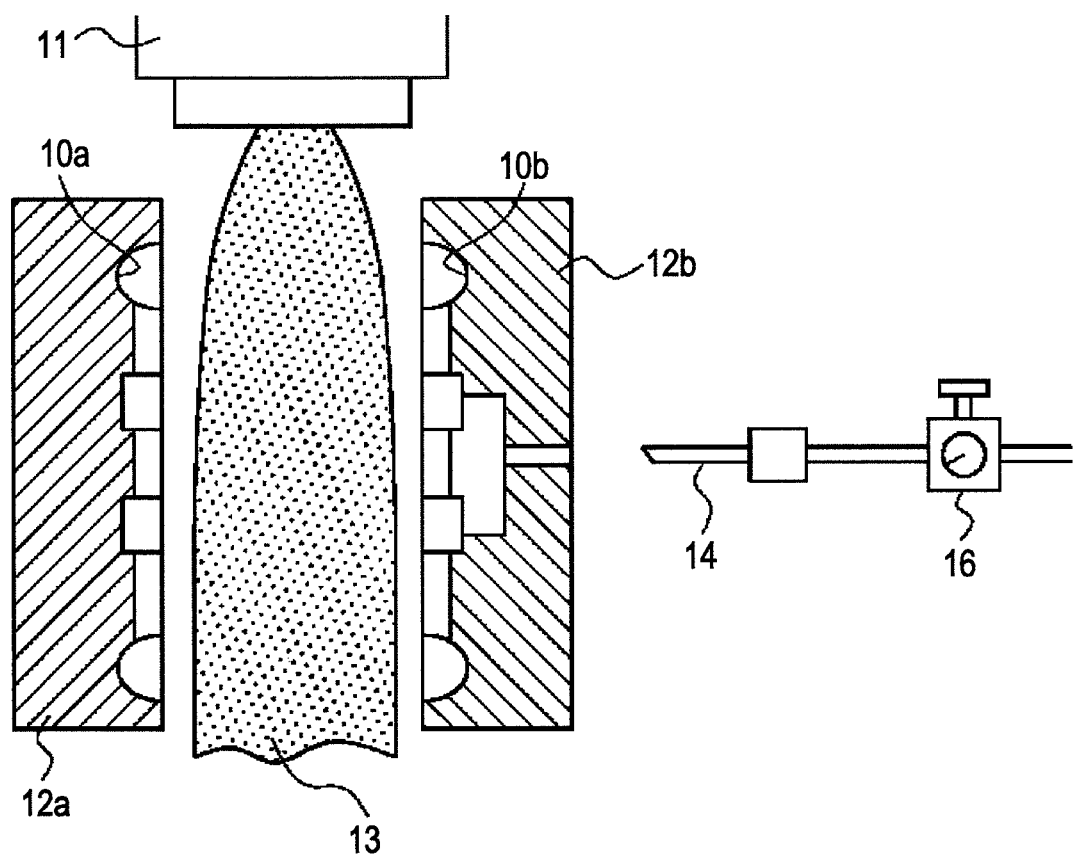
FIG. 4 is a schematic view for explaining a first process of a method of manufacturing the tubular molded foam according to an embodiment of the present disclosure.
Figure 5:
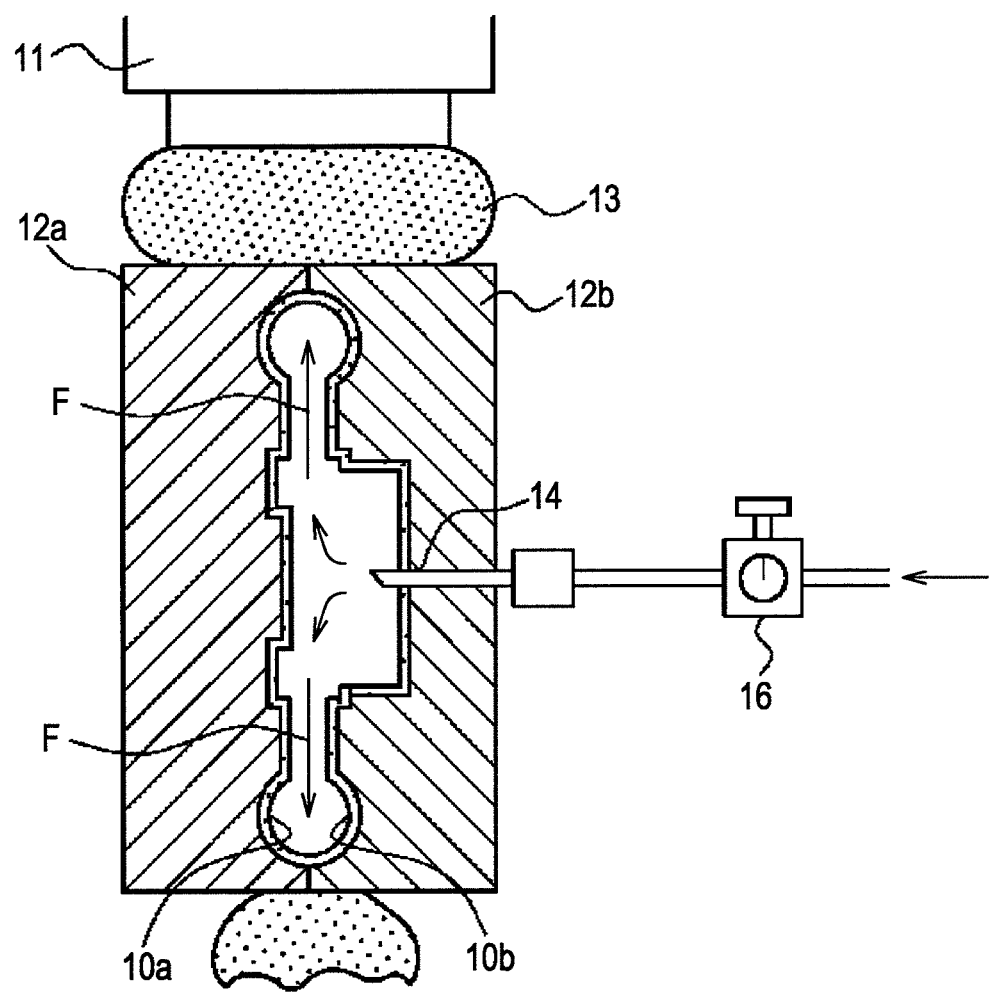
FIG. 5 is a schematic view for explaining a second process of the method of manufacturing the tubular molded foam according to an embodiment of the present disclosure.
Figure 6:
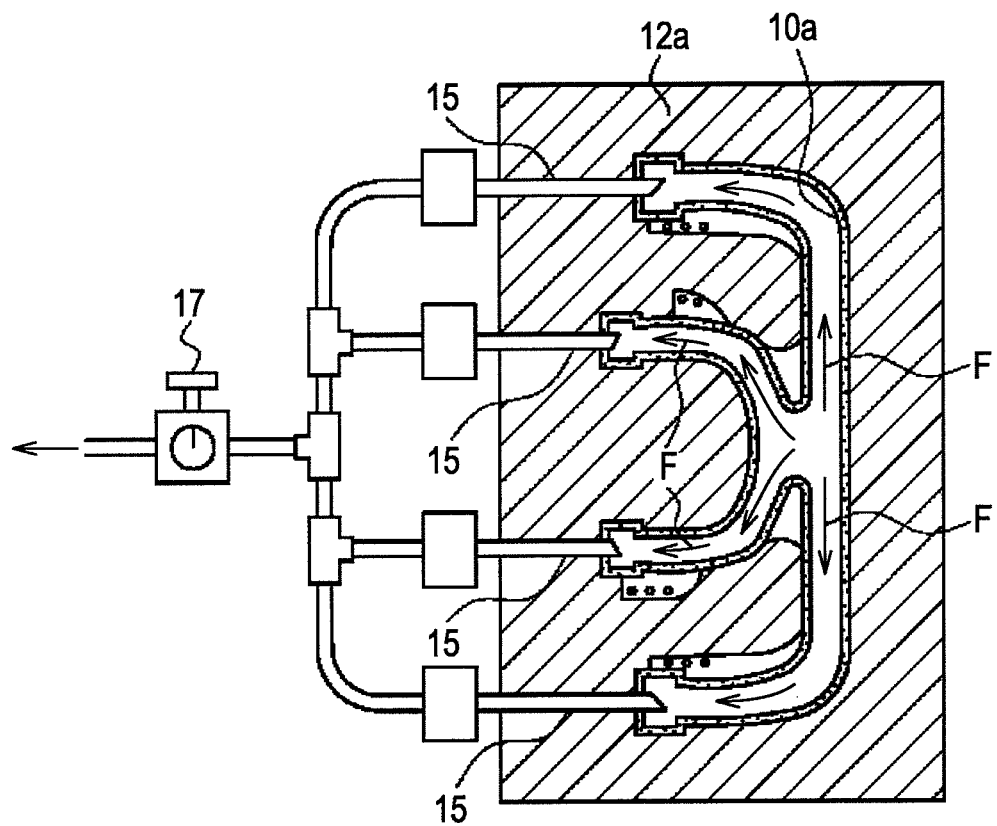
FIG. 6 is a schematic view for explaining the second process of the method of manufacturing the tubular molded foam according to an embodiment of the present disclosure.

Referring next to FIGS. 4 to 6, an example of the method of manufacturing the tubular molded foam 100 of this embodiment will be described. FIG. 4 is a schematic view showing the open state of each of split mold blocks 12a and 12b. FIG. 5 is a schematic view showing the closed state of each of the split mold blocks 12a and 12b shown in FIG. 4 when viewed from a mold block side surface. FIG. 6 is a cross-sectional view showing the side of the split mold block 12a on the contact surface of the two split mold blocks 12a and 12b to explain the closed state shown in FIG. 5.

First, as shown in FIG. 4, a foamed parison is injected toward the split mold blocks 12a and 12b from an annular dice 11, and a cylindrical foamed parison 13 is extruded between the split mold blocks 12a and 12b.

Next, as shown in FIG. 5, the split mold blocks 12a and 12b are clamped to thereby allow the foamed parison 13 to be sandwiched by the split mold blocks 12a and 12b. As a result, the foamed parison 13 is housed in cavities 10a and 10b of the split mold blocks 12a and 12b.

Next, as shown in FIGS. 5 and 6, in the state of clamping the split mold blocks 12a and 12b, a blow-in needle 14 and a blow-out needle 15 are allowed to penetrate through predetermined holes provided in the split mold blocks 12a and 12b, and the foamed parison 13 is pierced by the blow-in needle 14 and the blow-out needle 15 at the same time. When the leading ends of the blow-in needle 14 and the blow-out needle 15 enter the foamed parison 13, compressed gas, such as air, is immediately blown into the foamed parison 13 from the blow-in needle 14. The blown-in compressed gas is blown out from the blow-out needle 15 via the inside of the foamed parison 13. As a result, blow molding is carried out at a predetermined blow pressure.

Here, the blow-in needle 14 and the blow-in needle 15 will be described in more detail. The position which the blow-in needle 14 pierces is a position corresponding to the opening of the supply port 105 of the tubular molded foam 100 shown in FIG. 1. By inserting in the blow-in needle 14, a blow-in port for allowing the compressed gas to be blown into the foamed parison 13 is formed. Further, the position at which the blow-out needle 15 is inserted is a position corresponding to each opening of the fitting portions 102 (102a to 102d) of the tubular molded foam 100 shown in FIG. 1. By inserting the blow-in needle 15, a flow-out port for allowing the compressed gas to be flown out of the foamed parison 13 is formed.

As a result, the compressed gas supplied from the blow-in needle 14 is blown into the foamed parison 13, and the compressed gas supplied from the blow-out needle 15 is blown out via the inside of the foamed parison 13, thereby enabling blow molding at the predetermined blow pressure.

As described above, the blow-in needle 14 pierces from the opening of the supply port 105 of the tubular molded foam 100. Accordingly, as shown in FIG. 5, the blow-in needle 14 is inserted into the split mold block 12b from the surface on the opposite side of the split mold block 12a in the split mold block 12b.

As described above, the blow-out needle 15 is inserted into the split mold blocks 12a and 12b from the contact surface between the split mold blocks 12a and 12b as shown in FIG. 6, to pierce from each opening of the fitting portions 102 (102a to 102d) of the tubular molded foam 100.

Figure 7A:
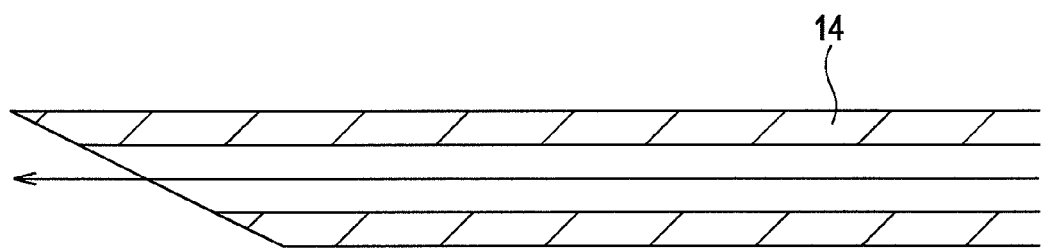
FIG. 7A is a sectional view showing a flow of a bamboo spear needle.

A bamboo spear needle as shown in FIG. 7A is preferably used as the blow-in needle 14. This bamboo spear needle has an advantage that a needle inserting direction coincides with a blow-in/blow-out direction and the bamboo spear needle can be easily processed. However, if the bamboo spear needle is used as the blow-out needle, the resin may enter from a needle leading-end hole, which may inhibit the air from being blown out.

Figure 7B:
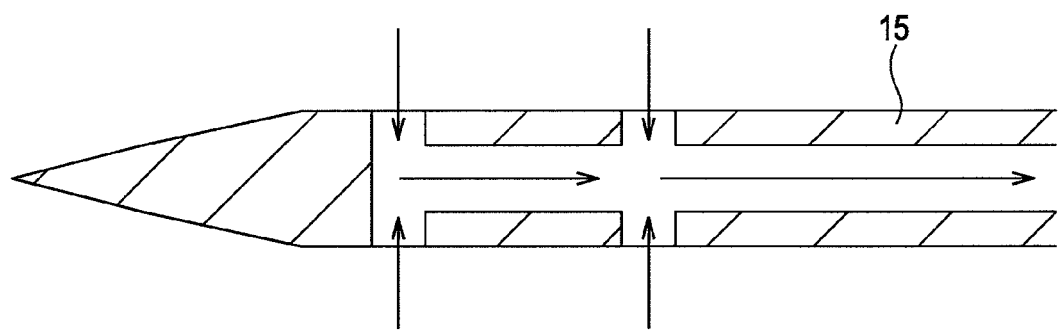
FIG. 7B is a sectional view showing a flow of a rocket needle.

For this reason, a rocket needle as shown in FIG. 7B is preferably used as the blow-out needle 15. The rocket needle is formed such that the blow-in/blow-out direction intersects the needle inserting direction.

The blow pressure is a differential pressure between the regulator 16 and the backpressure regulator 17. In the state where the split mold block 12a and the split mold block 12b are hermetically closed, the regulator 16 and the backpressure regulator 17 are each set to a predetermined pressure, and blow molding is carried out at the predetermined blow pressure. For example, the compressed gas having a predetermined pressure is allowed to be blown into the foamed parison 13 from the blow-in needle 14 for a predetermined period of time, thereby increasing the pressure (internal pressure) inside the foamed parison 13 from the atmospheric pressure to a predetermined pressure state.

The blow pressure is set to 0.5 to 3.0 kg/cm$^2$, preferably, 0.5 to 1.0 kg/cm$^2$. When the blow pressure exceeds 3.0 kg/cm$^2$, the thickness of the tube body X1 of the tubular molded foam 100 is easily reduced or the expansion ratio is easily lowered. Furthermore, when the blow pressure is less than 0.5 kg/cm$^2$, it is difficult to adjust the differential pressure between the regulator 16 and the backpressure regulator 17. In this case, it is difficult to deform the surface shape of an airway 205 within the tubular molded foam 100 along a channel direction F of the compressed gas flown into the foamed parison 13. For this reason, the blow pressure is set to 0.5 to 3.0 kg/cm$^2$, preferably 0.5 to 1.0 kg/cm$^2$.

In the case of carrying out blow molding at the predetermined blow pressure, a facility for adjusting the temperature of the compressed gas may be provided. This air conditioning facility enables heating of the compressed gas, which is supplied into the foamed parison 13 from the blow-in needle 14, to a predetermined temperature. As a result, the compressed gas supplied into the foamed parison 13 is set to the predetermined temperature. This facilitates foaming of the foaming agent contained in the foamed parison 13. Note that the predetermined temperature is preferably set to a temperature suitable for foaming the foaming agent.

It is also possible to supply the compressed gas into the foamed parison 13 from the blow-in needle 14 at room temperature, without providing any air conditioning facility. This eliminates the need for providing any air conditioning facility for adjusting the temperature of the compressed gas. Thus, the tubular molded foam 100 can be manufactured at low cost. After the blow molding, the tubular molded foam 100 needs to be cooled. Therefore, the execution of blow molding at room temperature contributes to a reduction in time for cooling the tubular molded foam 100 after the blow molding.

In this embodiment, the compressed gas supplied from the blow-in needle 14 is blown into the foamed parison 13 and exhausted from the cavities 10a and 10b of the split mold blocks 12a and 12b. Furthermore, the gap between the cavities 10a and 10b of the foamed parison 13 is eliminated to obtain a negative pressure state. Thus, a pressure difference (a pressure at which the internal pressure of the foamed parison 13 is higher than the external pressure) is generated inside and outside the foamed parison 13 housed in the cavities 10a and 10b in the split mold blocks 12a and 12b. As a result, the foamed parison 13 is pressed against the wall surface of each of the cavities 10a and 10b. In this manner, the tubular molded foam 100 having the fluid channel inside the tube body X1 is formed.

Note that in the manufacturing process described above, there is no need to simultaneously carry out the process of allowing the compressed gas to be blown into the foamed parison 13 and the process of generating the negative pressure outside the foamed parison 13, and it is possible to carry out these processes at different timings. It is also possible to press the foamed parison 13 against the wall surface of each of the cavities 10a and 10b of the split mold blocks 12a and 12b by performing only one of the processes. This enables formation of the tubular molded foam 100 having the fluid channel inside the tube body X1.

Figure 8:
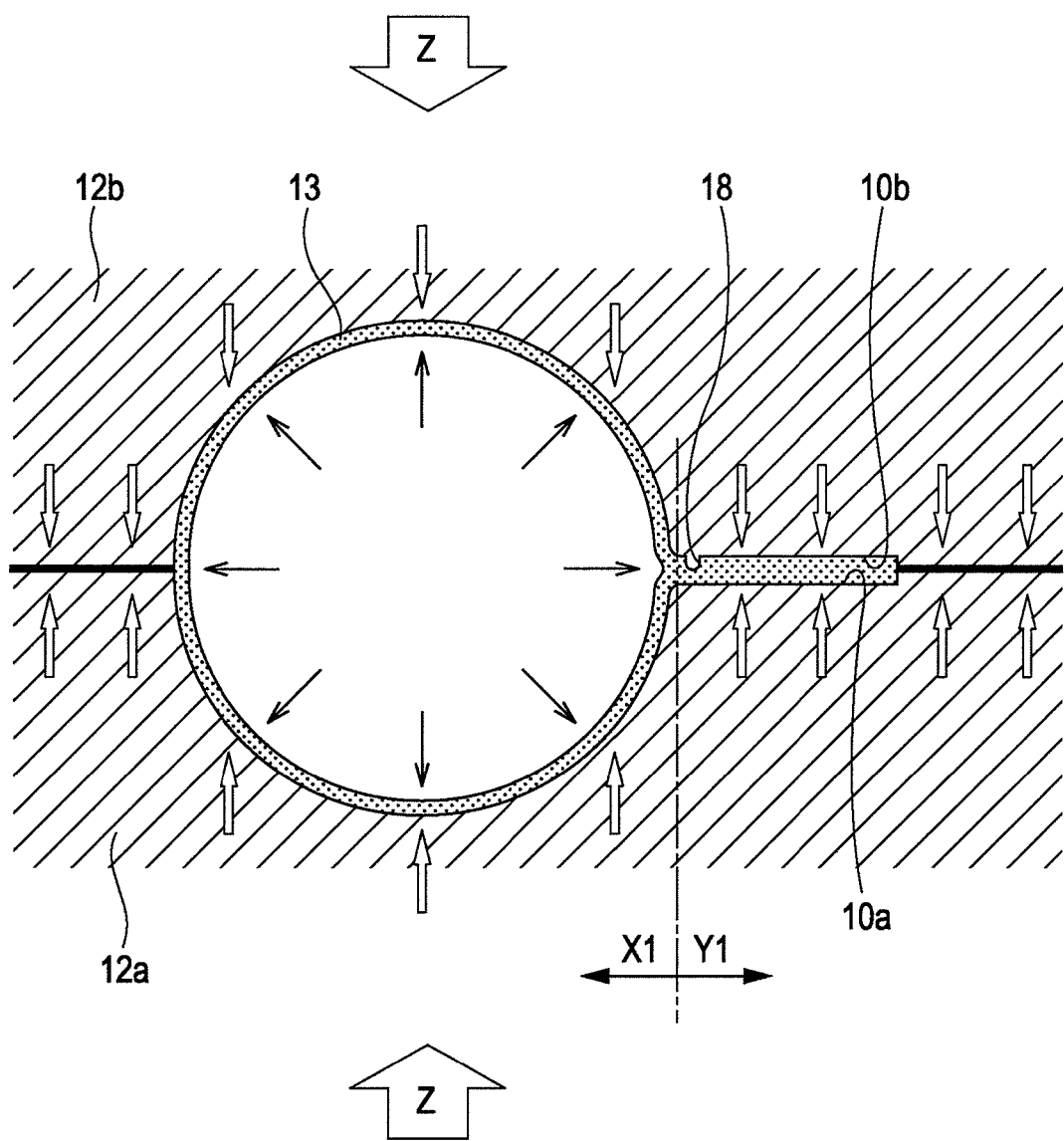
FIG. 8 is a sectional view showing the vicinity of the fitting portion during clamping with a split mold block.

As shown in FIG. 8, the foamed parison 13 is clamped by the split mold blocks 12a and 12b with the pressing force Z. Accordingly, as described above, the portion corresponding to the tube body X1 of the foamed parison 13 is pressed against the cavity surfaces 10a and 10b by the predetermined blow pressure. The portion corresponding to the plate portion Y1 of one of the flange portions 103 (103a to 103d) and the bridge portions 104 (104e, 104f) is pressed in the thickness direction, and is compressed to the thickness between the surfaces of the cavity 10a and 10b of the split mold blocks 12a and 12b.

Figure 9:
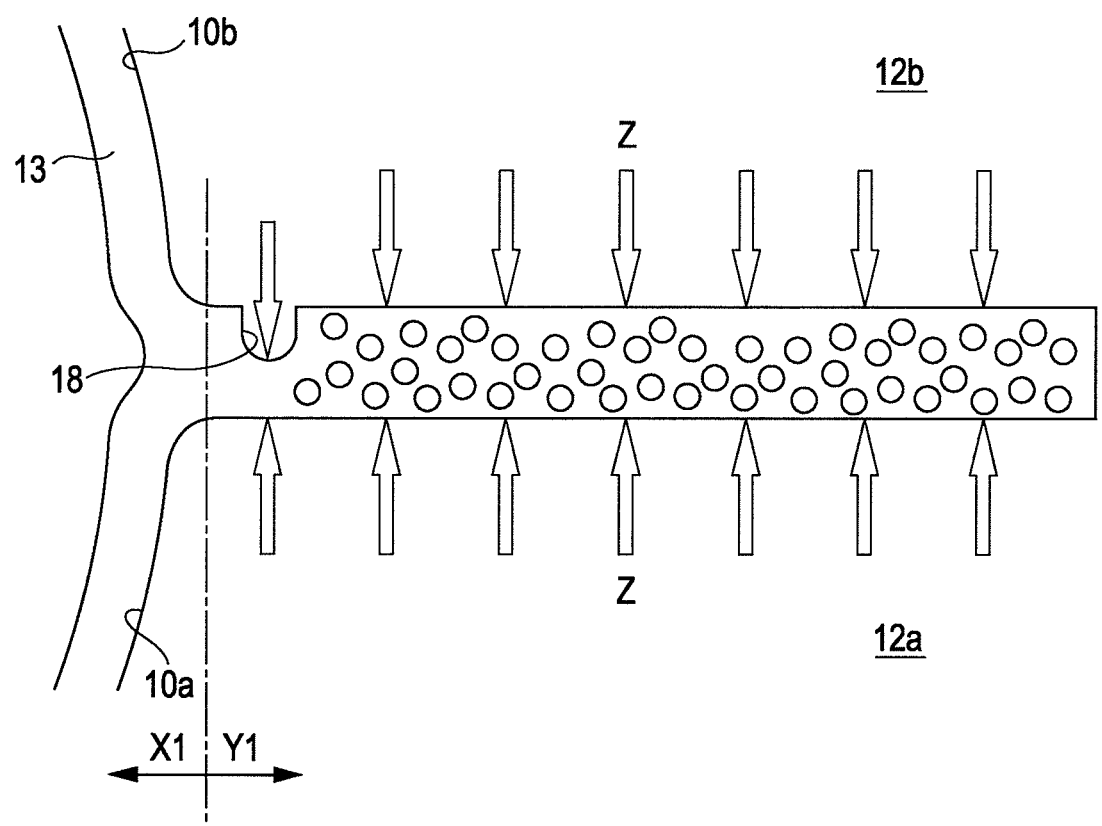
FIG. 9 is a diagram for explaining an operation of a protrusion during clamping with the split mold block.

FIG. 9 shows the vicinity of the plate portion Y1 in the clamped state.

As described above, the foamed parison 13 is formed of a closed cell structure (closed cell content of 70% or more) having a plurality of foamed cells at a 2.5-fold expansion ratio or more. Note that the average cell diameter of each foamed cell is less than 300 μm, preferably, less than 100

μm. In the plate portion Y1, the pressing force Z caused due to clamping is applied also to these foamed cells.

Here, a protrusion 18 for forming each recessed groove 106 of the tubular molded foam 100 is provided in the vicinity of the joint surface between the plate portion Y1 and the tube body X1 on the cavity surface 10b of the split mold block 12b in this embodiment.

Thus, the plate portion Y1 is compressed to the thickness between the cavity surfaces 10a and 10b. As a result, also in the state where a space is formed in the inner portion of the tube body X1, the protrusion 18 functions as a dam with respect to the movement of the foamed cells, so that the movement of the foamed cells is dammed by the protrusion 18. Accordingly, the foamed cells within the plate portion Y1 remain in the plate portion Y1 even when the foamed cells are moved by the pressing of clamping, and are directly cooled by the split mold blocks 12a and 12b.

The portion corresponding to the tube body X1 of the foamed parison 13 is formed as follows. That is, as described above, the compressed gas such as air is blown into the foamed parison 13 from the blow-in needle 14. The compressed air is blown out from the blow-out needle 15 via the inside of the foamed parison 13. In this case, the cavity surfaces 10a and 10b are pressed with the predetermined blow pressure. After that, the inside of the foamed parison 13 is cooled with the predetermined blow pressure.

The temperature of the compressed gas to be supplied into the foamed parison 13 from the blow-in needle 14 for the purpose of cooling is set to 10° C. to 30° C., preferably, room temperature (for example, 23° C.). The setting of the temperature of the compressed gas to the room temperature eliminates the need for providing any air conditioning facility for adjusting the temperature of the compressed gas. Therefore, the tubular molded foam 100 can be manufactured at low cost. Furthermore, when an air conditioning facility is provided to set the temperature of the compressed gas to be supplied into the foamed parison 13 from the blow-in needle 14 to be lower than the room temperature, the time for cooling the tubular molded foam 100 can be shortened. Note that it is preferable to perform cooling for 30 to 80 seconds, though it depends on the temperature of the compressed gas.

In this manner, the fluid channel is formed inside the tube body X1 of the tubular molded foam 100. As a result, the tube body X1 having a smooth channel surface inside the tube body X1 can be formed.

It is also possible to manufacture the tubular molded foam 100 having the airway 205 through which a fluid flows more easily in the channel direction F than in the opposite direction of the channel. This channel direction F is the same direction as the fluid circulation direction in the channels A, B-1, B-2, and C of the tubular molded foam 100. Accordingly, the tubular molded foam 100 in which the fluid easily flows in the fluid circulation direction in each channel can be manufactured.

In the case of forming the tubular molded foam 100 of this embodiment, polypropylene having a melt tension ranging from 30 to 350 mN at 230° C. is preferably used as polypropylene-based resin that can be used as the foamed resin as the molding material. In particular, the polypropylene-based resin is preferably made of propylene homopolymers having a long-chain branch structure. More preferably, ethylene-propylene block copolymers are added to this polypropylene-based resin.

To improve the resistance to impact and maintain the rigidity as the tubular molded foam 100, hydrogenated styrene-based thermoplastic elastomer is added to the polypropylene-based resin. The additive amount of the hydrogenated styrene-based thermoplastic elastomer is 5 to 40 wt %, preferably, 15 to 30 wt % with respect to the polypropylene-based resin.

Specifically, examples of the hydrogenated styrene-based thermoplastic elastomer include hydrogenated polymers such as styrene-butadiene-styrene block copolymers, styrene-isoprene-styrene block copolymers, and styrene-butadiene random copolymers. The hydrogenated styrene-based thermoplastic elastomer has a styrene content of less than 30 wt %, preferably, less than 20 wt %, and MRF at 230° C. (measured at a test temperature of 230° C. and a test load of 2.16 kg in accordance with JIS K-7210) of 10 g/10 min or less, preferably, 5.0 g/10 min or less and 1.0 g/10 min or more.

In the case of preparing foamed resin, ethylene-α-olefin having a low density is preferably blended in the range of 1 to 20 wt % as polyolefin-based polymers to be blended with the polypropylene-based resin. The low-density ethylene-α-olefin to be used preferably has a density of 0.91 g/cm$^3$ or less. More specifically, ethylene-α-olefin copolymers obtained by copolymerizing ethylene with α-olefin having 3 to 20 carbon atoms are preferably used. As preferable examples, propylene, 1-butene, 1-pentene, 1-hexene, 1-heptene, 1-octene, 1-nonene, 1-decene, 1-dodecene, 4-methyl-1-pentene, and 4-methyl-1-hexene may be used. As particularly preferable examples, 1-butene, 1-hexene, and 1-octene are used. The α-olefin having 3 to 20 carbon atoms described above can be used alone, or in combination of two or more.

The content of monomeric units based on ethylene contained in ethylene-α-olefin copolymers is preferably in the range of 50 to 99 wt % with respect to the ethylene-α-olefin copolymers. The content of monomeric units based on α-olefin is preferably in the range of 1 to 50 wt % with respect to ethylene-α-olefin copolymers. In particular, straight-chain very-low polyethylene or ethylene-based elastomer polymerized using metallocene-based catalyst, or propylene-based elastomer is preferably used.

Examples of the foaming agent that can be used when the tubular molded foam 100 of this embodiment is formed include physical foaming agent, chemical foaming agent, and the mixture thereof. As the physical foaming agent, inorganic physical foaming agent such as air, carbon dioxide, nitrogen gas, or water, organic physical agent such as butane, pentane, hexane, dichloromethane, or dichloroethane, and supercritical fluids thereof can be used. The supercritical fluids are preferably made using carbon dioxide, nitrogen, or the like. For example, in the case of using nitrogen, the supercritical fluid can be made at a critical temperature of −149.1° C. and a critical pressure of 3.4 MPa or more. On the other hand, in the case of using carbon dioxide, the supercritical fluid can be made at a critical temperature of 31° C. and a critical pressure of 7.4 MPa or more.

EXAMPLE

Figure 10:
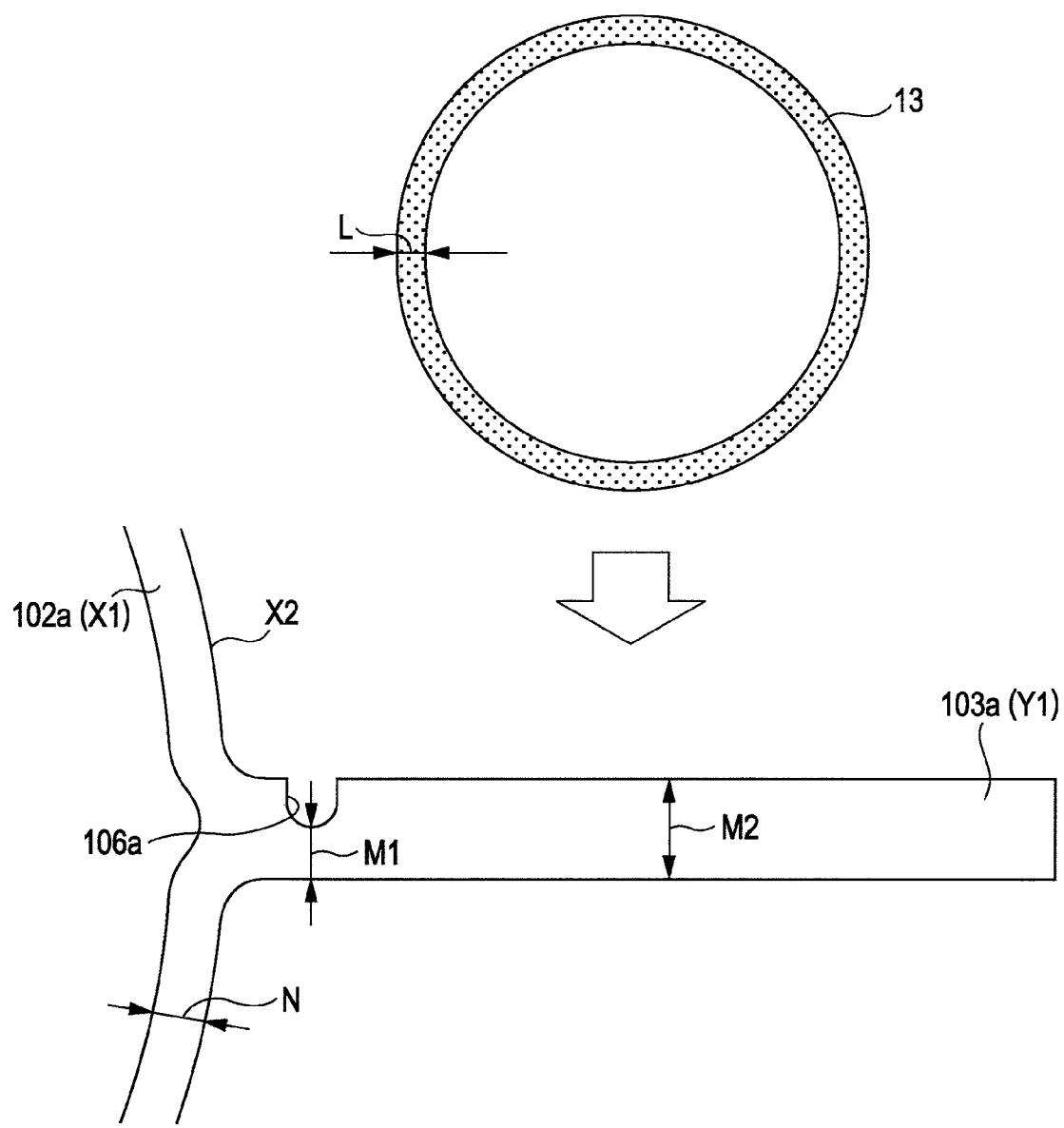
FIG. 10 is a schematic view for explaining an embodiment of the tubular molded foam according to an embodiment of the present disclosure.

Next, a specific example of the above-described embodiment will be described with reference to FIG. 10. However, the example to be described below is illustrated by way of example only, and the present disclosure is not limited to the following example.

In this example, the tubular molded foam 100 was formed by the manufacturing method described above with a thickness L of the foamed parison 13 being 3 mm. The dimensions of the formed tubular molded foam 100 were as follows. That is, the thickness N of the tube body X1 (fitting portion 102a in the example of FIG. 10) was 2.5 mm; a thickness M2 of the plate portion Y1 (flange portion 103a in the example of FIG. 10) was 5 mm; and the thickness M1 at the deepest portion of each recessed groove 106 of the plate portion Y1 was 2.5 mm.

In this example, the foamed parison 13 in the portion serving as the tube body X1 was pressed against the cavity surfaces 10a and 10b of the split mold blocks 12a and 12b with the predetermined blow pressure by blow molding. As a result, a thickness N of the tube body X1 was slightly smaller than the thickness L of the foamed parison 13. The plate portion Y1 was set to have a thickness 2L by superimposing two foamed parisons 13 and was clamped by the split mold blocks 12a and 12b. The two superimposed foamed parisons 13 were compressed in the thickness direction to the thickness between the cavity surfaces 10a and 10b. As a result, the thickness M2 of the plate portion Y1 was smaller than two times of the thickness L of the foamed parison 13.

Thus, in this example, the molding was formed by being clamped with the split mold blocks 12a and 12b such that the thickness M1 at the deepest portion of each recessed groove 106 of the plate portion Y1 was set to be about a half of the thickness M2 of the plate portion Y1. As a result, the tubular molded foam 100 was formed in a favorable shape as designed.

Figure 18:
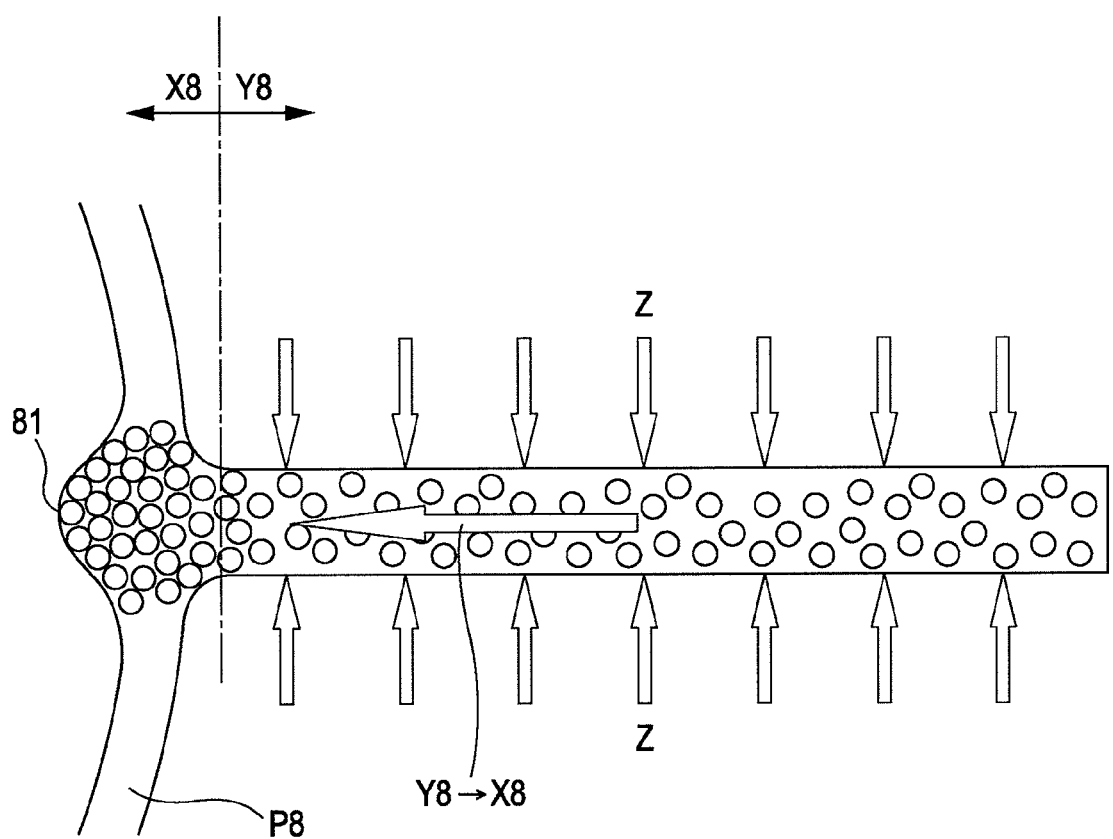
FIG. 18 is a schematic view for explaining a structural change generated in a tubular molded foam with a plate portion of a related art.

That is, the uplift (see FIG. 18) of the lump to the inside of the tube body by the manufacturing method of the related art as described above was not generated at all in this example. Thus, in this example, when clamping by the manufacturing method according to this embodiment described above, it was confirmed that the protrusion 18 for forming each recessed groove 106 acted in the following manner. Specifically, as shown in FIG. 9, the protrusion 18 acted as a dam with respect to the movement of the foamed cells in the foamed resin in the portion serving as the plate portion Y1, and the foamed cells moved to the space within the tube body X1 from the plate portion Y1. As a result, the foamed cells stayed in the plate portion Y1.

When the thickness of the plate portion Y1 is not uniform, the thickness M1 of the plate portion Y1 at the deepest portion of each recessed groove 106 described above is set to be about a half of the thickness M2 of the vicinity of the recessed groove 106 in the plate portion Y1.

Advantageous Effects of this Embodiment

Next, advantageous effects of the tubular molded foam 100 of this embodiment will be described in comparison with a tubular molded foam with a plate portion of a related art in which the recessed grooves 106 are not formed.

As described above with reference to FIG. 18, in the tubular molded foam with a plate portion of the related art, when the foamed parison is clamped with the split mold block, the foamed resin serving as the plate portion Y8 is compressed in the thickness direction to the thickness between the cavity surfaces of the split mold block. As a result, the foamed cells within the foamed resin in the portion serving as the plate portion Y8 move in the direction of the space formed inside the tube body X8. The foamed cells are concentrated inside the tube body X8, resulting in generation of a lump.

If such a lump is generated, the inside shape of the tube body X8 differs from the designed shape. As a result, the resistance of watercourse upon circulation of a fluid such as air through the channel within the tube body X8 is changed, so that the flow efficiency of the fluid is lowered. Furthermore, allophone and vibration may be caused due to the presence of the lump depending on the conditions such as the circulation speed of the fluid.

Moreover, the allophone or vibration caused upon circulation of the fluid may be further increased when defoaming occurs due to coarsening of the foams in the lump generated within the tube body X8.

When the flange portion is provided outside the fitting portion, another tubular member to be connected is inserted and fitted into the fitting portion. In this case, if a lump is generated due to the concentration of the foamed cells inside the fitting portion as described above, it is difficult to insert another tubular member into the fitting portion depending on the size of the lump.

If this problem is caused, the formed tubular molded foam with a plate portion cannot be used at all. Accordingly, it is necessary to scrape off a part of the generated lump one by one by manual operation. However, it takes a lot of labor and cost for an operator to scrape off the lump by manual operation. Considering the labor and cost, the tubular molded foam with a lump has to be treated as a defective product in a mass-produced product. As a result, it is difficult to mass-produce tubular molded foams with a plate portion at low cost.

On the other hand, according to the tubular molded foam 100 of this embodiment, no lump is generated due to the foams for the following reasons. Specifically, the recessed grooves 106 are formed in the vicinity of the joint surface of the plate portion Y1 with the tube body X1. Thus, as described above with reference to FIG. 9, the protrusion 18 for forming each recessed groove 106 functions as a dam for damming the movement of the foamed cells also when clamping the foamed parison 13 with the split mold blocks 12a and 12b. This protrusion 18 prevents the foamed cells within the plate portion Y1 from moving to the space formed inside the tube body X1 and keeps the foamed cells in the plate portion Y1.

Thus, according to this embodiment, even in the case of mass-producing the tubular molded foam 100, it is sufficient to carry out only a typical molding operation of extruding the foamed parison 13 and clamping and blowing it with the split mold blocks 12a and 12b. This makes it possible to manufacture the tubular molded foam 100 having an almost designed shape, without generating a lump, unlike the conventional product.

Hence, the light-weight tubular molded foam 100 having high thermal insulating properties can be mass-produced at low cost with an accurate dimensional precision, by using a molten resin having a high expansion ratio.

Thus, according to this embodiment, a high expansion ratio can be achieved in the tube body X1. On the other hand, a sufficient structural strength can be achieved in the plate portion Y1 (flange portion 103 and bridge portion 104). Furthermore, the tubular molded foam 100 can be mass-produced at low cost. Also in the case of circulating a fluid such as air inside the tube body X1, the mass-produced tubular molded foam 100 has an advantage in that the flow efficiency of the fluid is excellent and occurrence of allophone or vibration is prevented.

Accordingly, also in the case of using the tubular molded foam 100 as a duct for an air conditioner, excellent thermal insulating properties and light-weight can be achieved. At the same time, the structural strength: for connecting another member at the flange portion can be sufficiently ensured.

According to this embodiment, also inside the fitting portion 102 of the tube body X1, no lump is generated due to the foamed cells as described above, and the molding can be manufactured in an almost designed shape. This enables another tubular member to be connected to be reliably inserted and fitted into the fitting portion 102. Specifically, the tubular molded foam 100 according to this embodiment has a configuration in which the flange portion 103 is joined with the outside of the fitting portion 102, while having a configuration in which another tubular member is reliably fitted into the fitting portion 102. As a result, the tubular molded foam 100 can be mass-produced at low cost.

The problem that a lump is generated within the tube body as described above with reference to FIG. 18 in the tubular molded foam of the related art appears remarkably, particularly when the expansion ratio is 2.5 times or more.

According to this embodiment, even when the molding is manufactured at the expansion ratio of the foamed parison 13 of 2.5 times or more, the generation of the lump in the tube body X1 can be reliably suppressed. As a result, the tubular molded foam 100 can be obtained as a molded product having a designed shape.

According to this embodiment, the recessed grooves 106 are provided at positions other than the vicinity of the edge portion in the plate portion Y1 as described above. Therefore, the tubular molded foam 100 can obtain the advantageous effects described above, and the structural strength in the joint portion between the plate portion Y1 and the tube body X1 can be sufficiently ensured.

[Another Example of Manufacturing Method]

Next, another method of manufacturing the tubular molded foam 100 according to the embodiment described above will be described with reference to FIG. 11.

Figure 11:
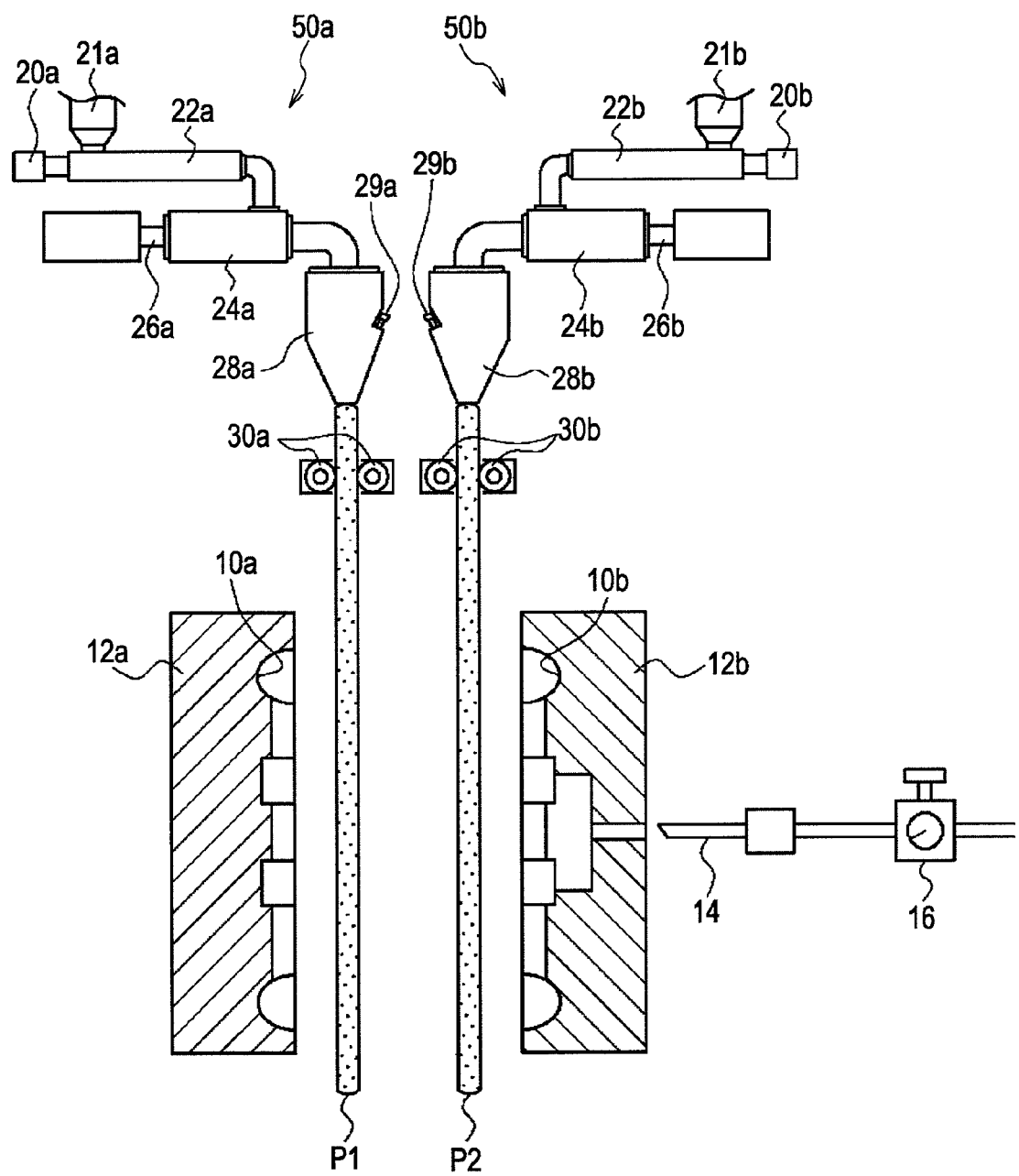
FIG. 11 is a schematic view for explaining another example of the method of manufacturing the tubular molded foam according to an embodiment of the present disclosure.

According to another manufacturing method described herein, a sheet-like molten resin is formed by being extruded between the split mold blocks 12a and 12b as shown in FIG. 11, instead of forming the cylindrical foamed parison 13 by extruding it between the split mold blocks 12a and 12b by the manufacturing method described above.

As shown in FIG. 11, a molding apparatus used in another manufacturing method includes two extruding devices 50a and 50b and the split mold blocks 12a and 12b similar to those used in the manufacturing method example described above.

The extruding devices 50 (50a and 50b) are arranged such that molten resin sheets P1 and P2 of foamed resin in a melted state, which are made of material similar to the foamed parison 13 in the example of the manufacturing method described above, are arranged to be suspended in substantially parallel to each other at predetermined intervals between the split mold blocks 12a and 12b. Adjustment rollers 30a and 30b are arranged below T-dies 28a and 28b for extruding the molten resin sheets P1 and P2. These adjustment rollers 30a and 30b adjust the thickness or the like of each of the molten resin sheets P1 and P2. The extruded molten resin sheets P1 and P2 are formed by being sandwiched and clamped with the split mold blocks 12a and 12b.

Since the two extruding devices 50 (50a and 50b) have the same configuration, one extruding device 50 will be described with reference to FIG. 11.

Each extruding device 50 includes a cylinder 22 provided with a hopper 21, a screw (not shown) provided in the cylinder 22, a hydraulic motor 20 connected to the screw, an accumulator 24 communicating with the cylinder 22, a plunger 26 provided in the accumulator 24, T-die 28, and a pair of adjustment rollers 30.

A resin pellet input from the hopper 21 is melted and kneaded due to rotation of the screw by the hydraulic motor 20 in the cylinder 22. Then, a certain amount of resin in the melted state is transferred and accumulated into the accumulator 24. Furthermore, the molten resin is sent to the T-die 28 by driving of the plunger 26. In the T-die 28, the molten resin is pressed into a sheet shape. Specifically, consecutive molten resin sheets are extruded from extrusion slits formed at lower ends of the T-die 28. The extruded molten resin sheets are sent out downward while being nipped and pressed by the pair of adjustment rollers 30 arranged at an interval. Subsequently, the molten resin sheets are suspended between the split mold blocks 12a and 12b.

Specifically, the T-die 28 is provided with a die bolt 29 for adjusting the interval of the extrusion slits. As the adjustment mechanism for adjusting the slit interval, not only the mechanical mechanism using the die bolt 29, but also various well-known adjustment mechanisms may also be provided.

Specifically, as described above, the molten resin sheets P1 and P2 having foamed cells formed therein are extruded from the extrusion slits of the two T-dies 28a and 28b. The extruded molten resin sheets P1 and P2 are adjusted in a state with a uniform thickness in the vertical direction (extruding direction) by the die bolts 29 and the adjustment rollers 30 and are suspended between the split mold blocks 12a and 12b.

In this manner, when the molten resin sheets P1 and P2 are arranged between the split mold blocks 12a and 12b, these split mold blocks 12a and 12b are advanced in the horizontal direction. Next, molds (not shown) positioned on the outer periphery of each of the split mold blocks 12a and 12b are brought into close contact with the molten resin sheets P1 and P2. In this manner, the molds positioned on the outer periphery of each of the split mold blocks 12a and 12b hold the molten resin sheets P1 and P2. After that, on the cavity surfaces 10a and 10b of the split mold blocks 12a and 12b, the molten resin sheets P1 and P2 are subjected to vacuum suction. As a result, the molten resin sheets P1 and P2 are formed into shapes along the cavities 10a and 10b, respectively.

Next, the split mold blocks 12a and 12b are advanced and clamped in the horizontal direction. As in the manufacturing method described above, the blow-in needle 14 and the blow-out needle 15 are respectively caused to pierce the molten resin sheets P1 and P2. After that, compressed gas such as air is blown into each of the molten resin sheets P1 and P2 from the blow-in needle 14. The compressed air is blown out from the blow-out needle 15 through the inside of each of the molten resin sheets P1 and P2. In this manner, the inside of the portion serving as the tube body X1 of the tubular molded foam 100 is cooled.

Next, the split mold blocks 12a and 12b are caused to recede in the horizontal direction, and the split mold blocks 12a and 12b are demolded from the tubular molded foam 100.

Note that it is necessary to individually adjust the thickness, extrusion rate, thickness distribution in the extruding direction, and the like of each of the molten resin sheets P1 and P2 suspended between the pair of the split mold blocks 12a and 12b, in order to avoid occurrence of variations in thickness due to draw-down, neck-in, or the like.

The thickness, extrusion rate, thickness in the extruding direction, and the like of the resin sheets can be adjusted by using various well-known methods.

As described above, also in another example of the manufacturing method shown in FIG. 11, the tubular molded foam 100 in this embodiment can be suitably manufactured as in the manufacturing method described above with reference to FIGS. 4 to 9. It is also possible to form the tubular molded foam 100 corresponding to various conditions by using different materials, different expansion ratios, different thicknesses, or the like for the two molten resin sheets P1 and P2 in another example of the manufacturing method shown in FIG. 11.

Note that the embodiment described above is a preferred embodiment of the present disclosure, and the present disclosure is not limited thereto and can be modified in various manners based on the technical idea of the present disclosure.

Figure 12:
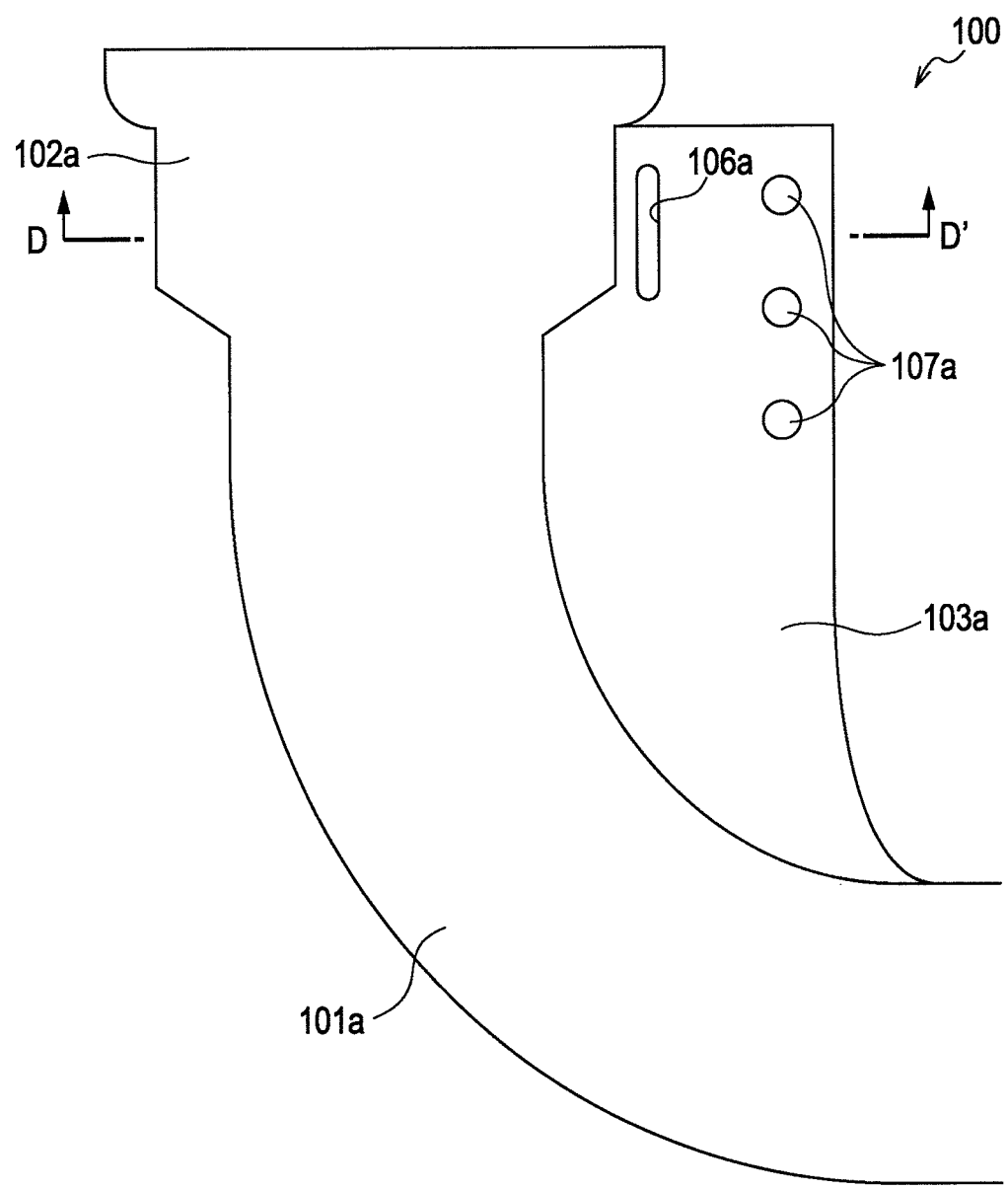
FIG. 12 is a schematic view for explaining another example of a formed position of a recessed groove.

For example, in the embodiment described above, the recessed grooves 106 are formed along the surface X2 of the outer wall of the tube body over the entire area except for the edge portion in the vicinity of the joint surface of the plate portion Y1 with the tube body X1. However, as shown in FIG. 12, the recessed grooves 106 may be formed only in the vicinity of the joint portion of the plate portion Y1 (flange portion 103a in the example of FIG. 12) with the fitting portion 102.

In this manner, even when the recessed grooves 106 are formed only in the vicinity of the joint portion with the fitting portion 102, no lump is generated inside the fitting portion 102 as described above. Accordingly, the tubular molded foam 100 which can be reliably fitted into another tubular member can be mass-produced at low cost.

Thus, when the plate portion Y1 is provided to be joined with the outside of a portion of the tube body X1 including at least a part of the fitting portion 102, the recessed grooves 106 may be formed in a portion of the plate portion Y1 including at least a part of the vicinity of the joint surface with fitting portion 102 to thereby avoid generation of a lump inside the fitting portion 102.

Thus, the recessed grooves 106 may be formed only in the vicinity of the joint surface between the tube body X1 and a specific portion of the plate portion Y1 where occurrence of a lump inside the tube body X1 is to be particularly avoided.

Figure 13:
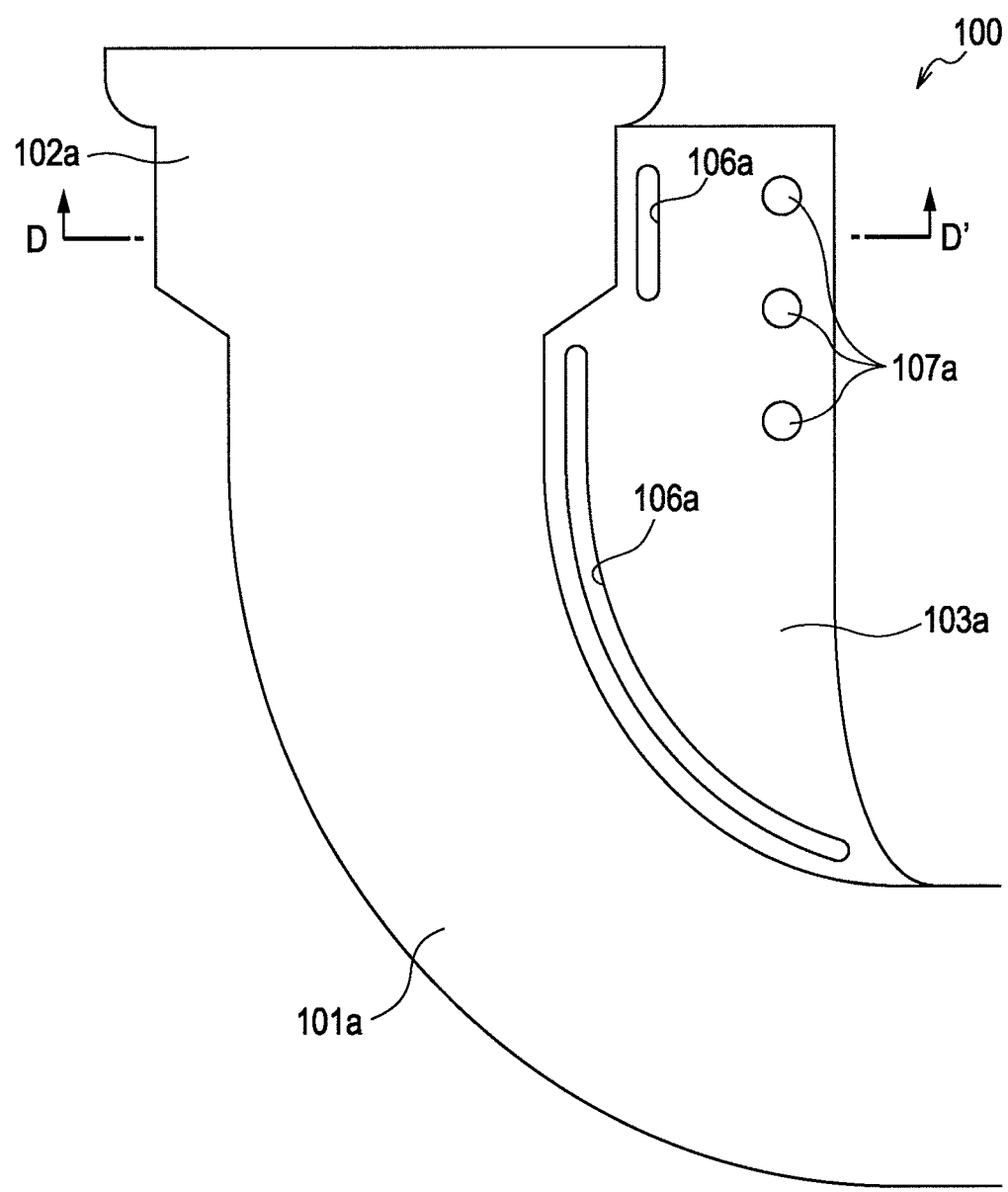
FIG. 13 is a schematic view for explaining further another example of the formed position of the recessed groove.

As shown in FIG. 13, the recessed grooves 106 are not necessarily formed in a continuous form, but the recessed grooves 106 may be formed from a plurality of intermittent grooves. Thus, the intermittent recessed grooves 106 may be formed, as long as they are formed in the vicinity of the joint surface of the plate portion Y1 with the tube body X1.

The embodiment has been described above assuming that the protrusion 18 for forming each recessed groove 106 is provided on the cavity surface 10b of the split mold block 12b as shown in FIGS. 8 and 9. However, the protrusion 18 may be provided on the cavity surface 10a of the split mold block 12a.

In the case of providing a plurality of plate portions Y1 joined with the tube body X1 as in the embodiment described above, the recessed grooves 106 are not necessarily formed on the same side but may be formed on different sides.

In the embodiment described above, the recessed grooves 106 formed on one surface of the plate portion Y1 have been described. However, the recessed grooves 106 are not limited to this configuration, but the recessed grooves may be formed on both surfaces of the plate portion Y1, as long as each recessed groove functions as a dam with respect to the movement of foamed cells upon clamping with the split mold blocks 12a and 12b.

FIGS. 14 to 17 schematically show an example in which the recessed grooves 106 are formed from both surfaces of the plate portion Y1. The examples of formation of the recessed grooves 106 shown in FIGS. 14 to 17 can be applied to any of the recessed grooves 106a to 106f in the flange portions 103a to 103d and the bridge portions 104e and 104f of the embodiment described above, or may be applied only to a part of the recessed grooves 106a to 106f.

Figure 14:
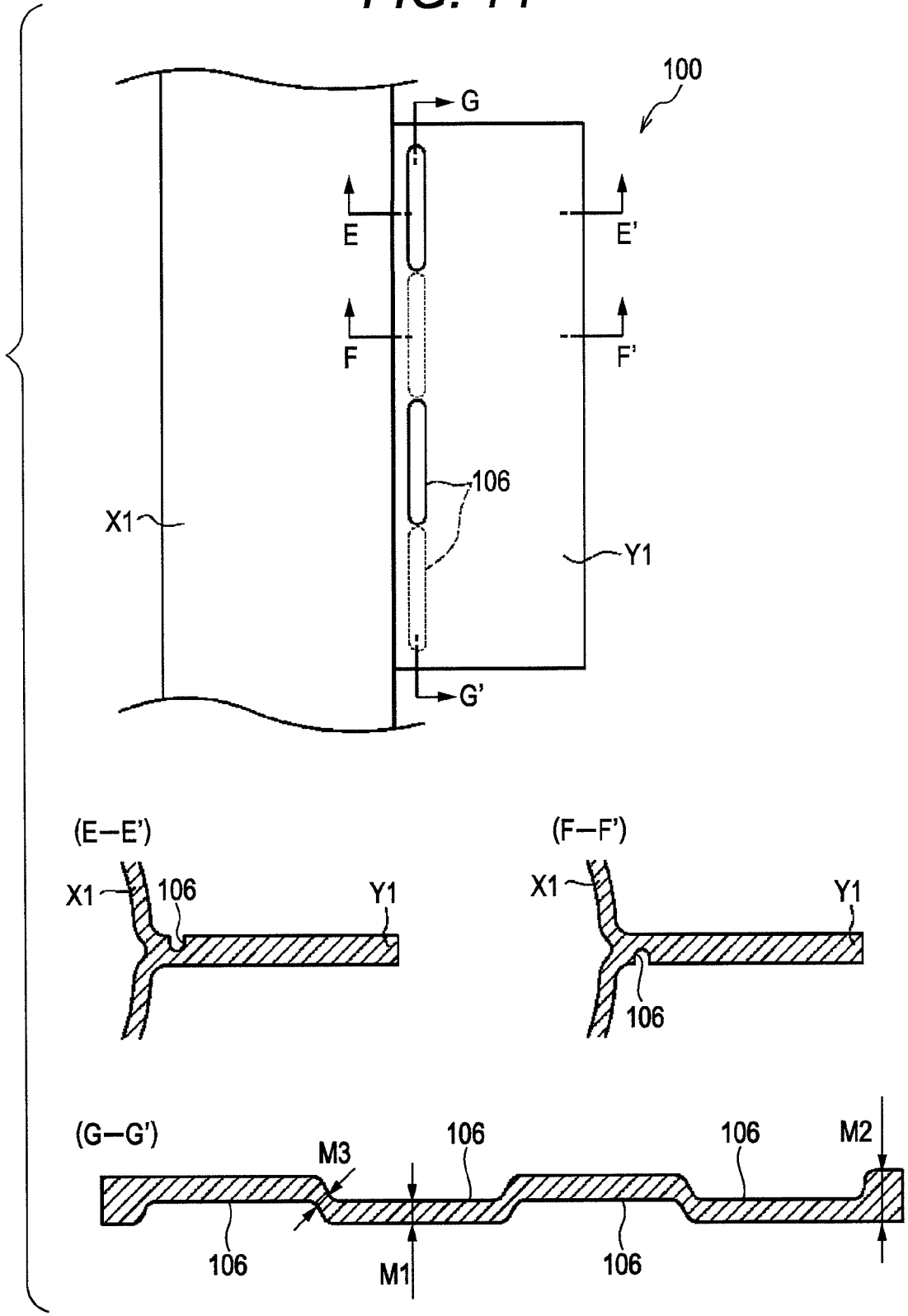
FIG. 14 is a schematic view for explaining an example in which the recessed groove is formed on both surfaces of a plate portion.

In the example of formation of the recessed groove 106 shown in FIG. 14, the recessed grooves are alternately formed on one surface and the other surface with respect to the plate portion Y1 such as the flange portion 103 and the bridge portion 104. Thus, the rigidity of the plate portion Y1 can be maintained by forming the recessed grooves alternately. Specifically, for example, the recessed grooves 106 are opened in the plane direction and the vertical direction of the plate portion Y1, and extend along the joint surface with the tube body X1. However, because the recessed grooves 106 are intermittently formed, even when a force is applied to the plate portion Y1 from the side on which the recessed grooves 106 are formed, the rigidity of the plate portion Y1 can be maintained with respect to the force from the direction. The rigidity of the plate portion Y1 can be maintained also with respect to the force applied from each direction.

Here, the cross-section of the portion in which the recessed groove 106 is formed in the plate portion Y1 will be described. In FIG. 14, the cross-section taken along the line G-G' is a cross-section taken along the longitudinal direction of the recessed groove 106. The cross-section taken along the line E-E' is a cross-section taken along the width direction of the recessed groove 106 formed on one surface of the plate portion Y1. The cross-section taken along the line F-F' is a cross-section taken along the width direction of the recessed groove 106 formed on the other surface of the plate portion Y1. As shown in FIG. 14, a thickness M3 of a portion between the alternately formed recessed grooves 106 is preferably smaller than the thickness M1 at the deepest portion of each recessed groove 106 of the plate portion Y1. That is, the positional relation between the recessed grooves 106 alternately formed on one surface and the other surface satisfies M3≤M1.

Alternately forming the recessed grooves on both surfaces of the plate portion Y1 with this positional relation prevents the foamed cells from moving from the space between the alternately formed recessed grooves, even when the foamed parison is clamped with the split mold blocks to form the tubular molded foam 100 as described above. Accordingly, as in the case of forming the recessed grooves only on one surface as in the embodiment described above, the movement of the foamed cells in the portions corresponding to the recessed grooves 106 can be dammed. Furthermore, the foamed cells within the plate portion Y1 can be kept within the plate portion Y1.

Therefore, the configuration in which the recessed grooves 106 are alternately formed on one surface and the other surface of the plate portion Y1 can also increase the rigidity of the plate portion Y1 as described above, and can obtain the same advantageous effects as those of the embodiment described above.

Figure 15:
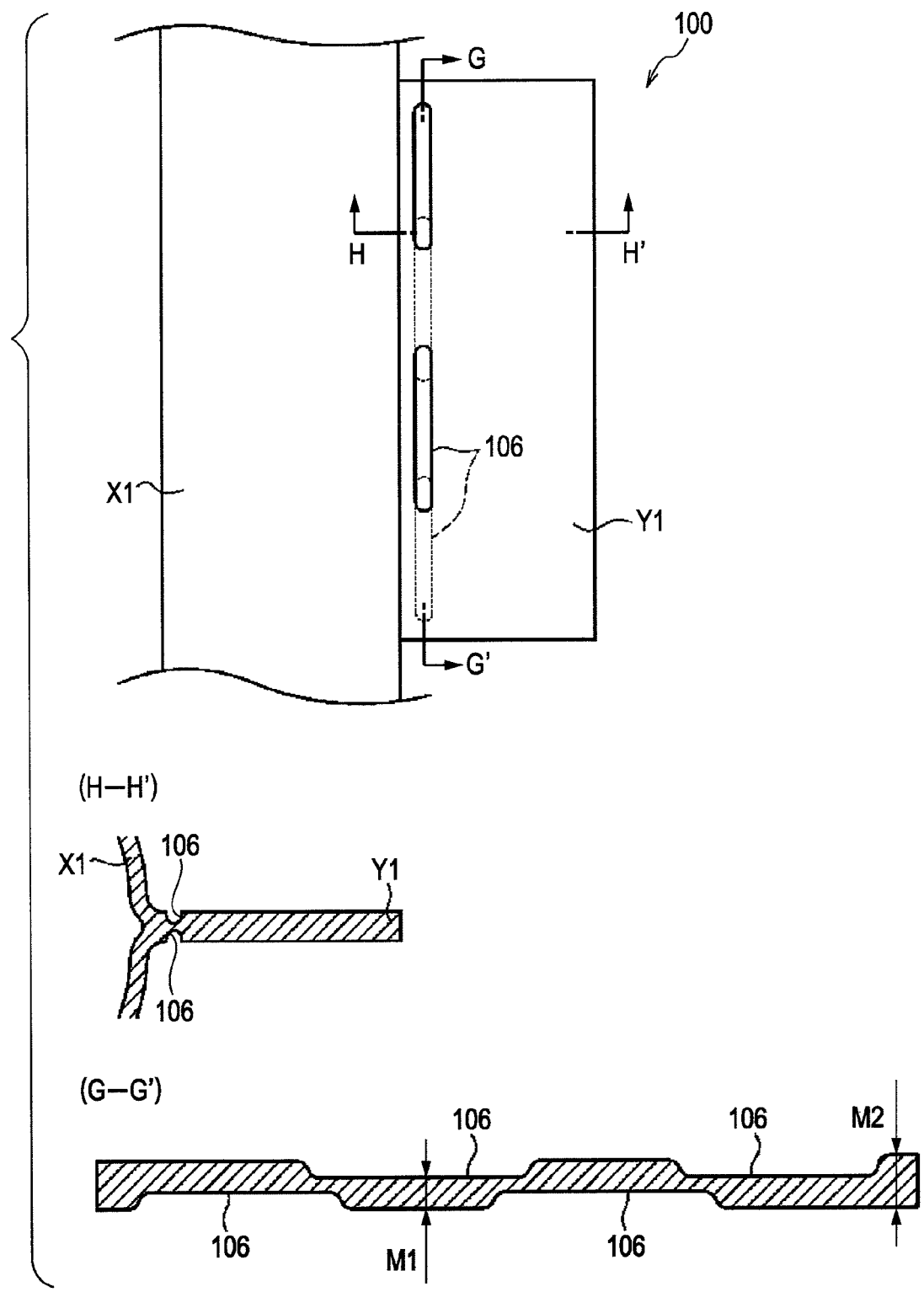
FIG. 15 is a schematic view for explaining another example in which the recessed groove is formed on both surfaces of the plate portion.

FIG. 15 shows another example of formation of the recessed groove 106 of the plate portion Y1. In FIG. 15, the cross-section taken along the line G-G' is a cross-section taken along the longitudinal direction of the recessed grooves 106. The cross-section taken along the line H-H' is a cross-section taken along the width direction of each recessed groove 106 formed on both surfaces of the plate portion Y1. As shown in FIG. 15, the recessed grooves may be formed such that the recessed grooves 106 alternately formed on one surface and the other surface of the plate portion Y1 partially overlap each other. In this case, as shown in the cross-sectional view taken along the line G-G', the thickness M1 at the deepest portion of each recessed groove 106 of the plate portion Y1 is formed to be larger than a half of the thickness M2 of the plate portion Y1.

Figure 16:
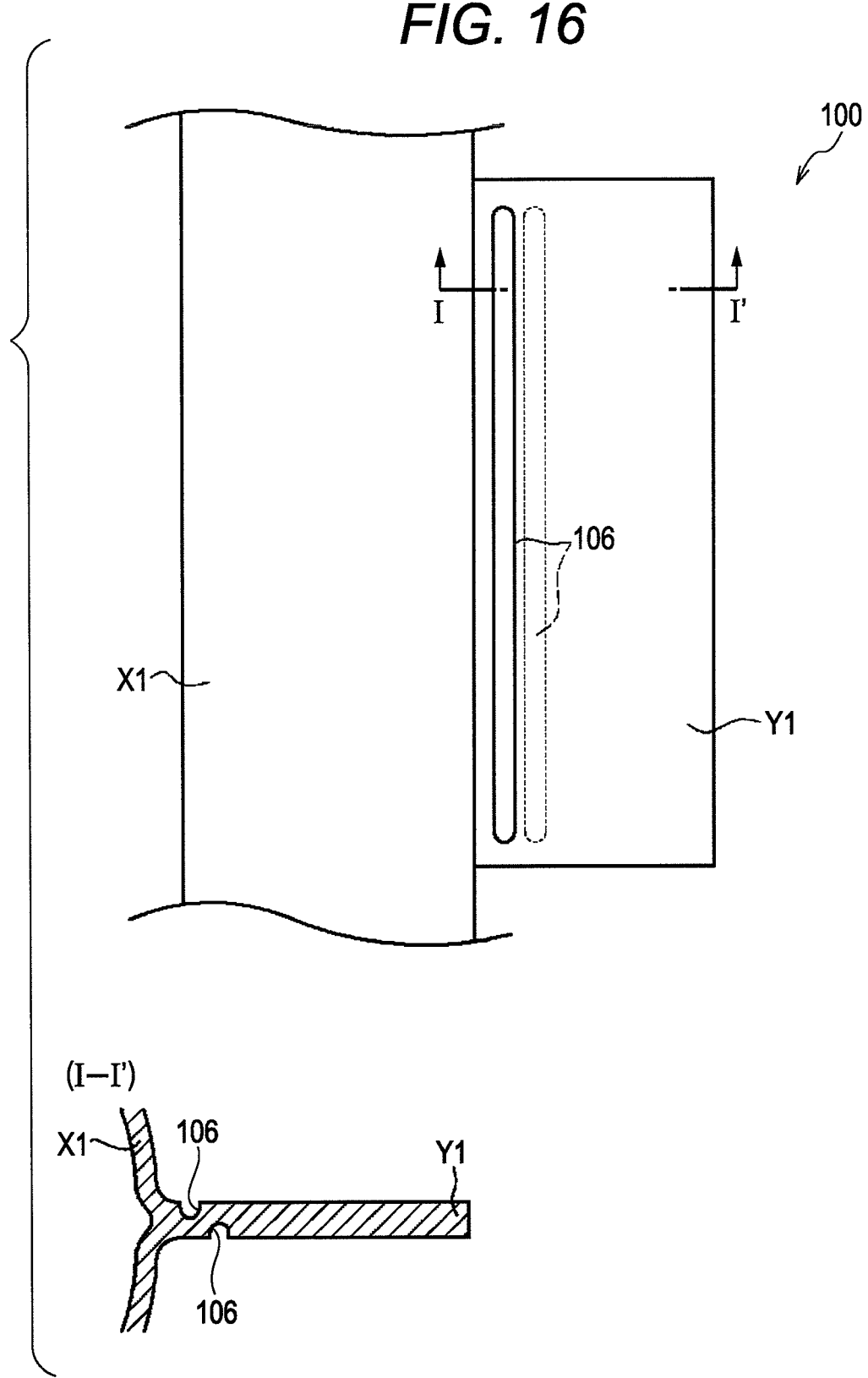
FIG. 16 is a schematic view for explaining further another example in which the recessed groove is formed on both surfaces of the plate portion.

FIG. 16 shows another example of formation of the recessed groove 106 of the plate portion Y1. In FIG. 16, the cross-section taken along the line G-G' is a cross-section taken along the longitudinal direction of the recessed groove 106. The cross-section taken along the line I-I' is a cross-section taken along the width direction of each recessed groove 106 formed on both surfaces of the plate portion Y1. As shown in FIG. 16, the recessed groove 106 formed on one surface and the recessed groove 106 formed on the other surface may be alternately formed in two lines. Specifically, the recessed grooves 106 having a shape along the joint surface between the tube body X1 including the tube portion 101, the supply port 105, and the fitting portion 102, and the plate portion Y1 may be alternately formed in the direction apart from the tube body X1.

The formation of the recessed grooves 106 as described above can reinforce the force for damming the movement of the foamed cells in the portions corresponding to the recessed grooves 106 when the foamed parison is clamped with the split mold blocks to form the tubular molded foam 100 as described above. This enables the foamed cells within the plate portion Y1 to be more reliably kept in the plate portion Y1.

Figure 17:
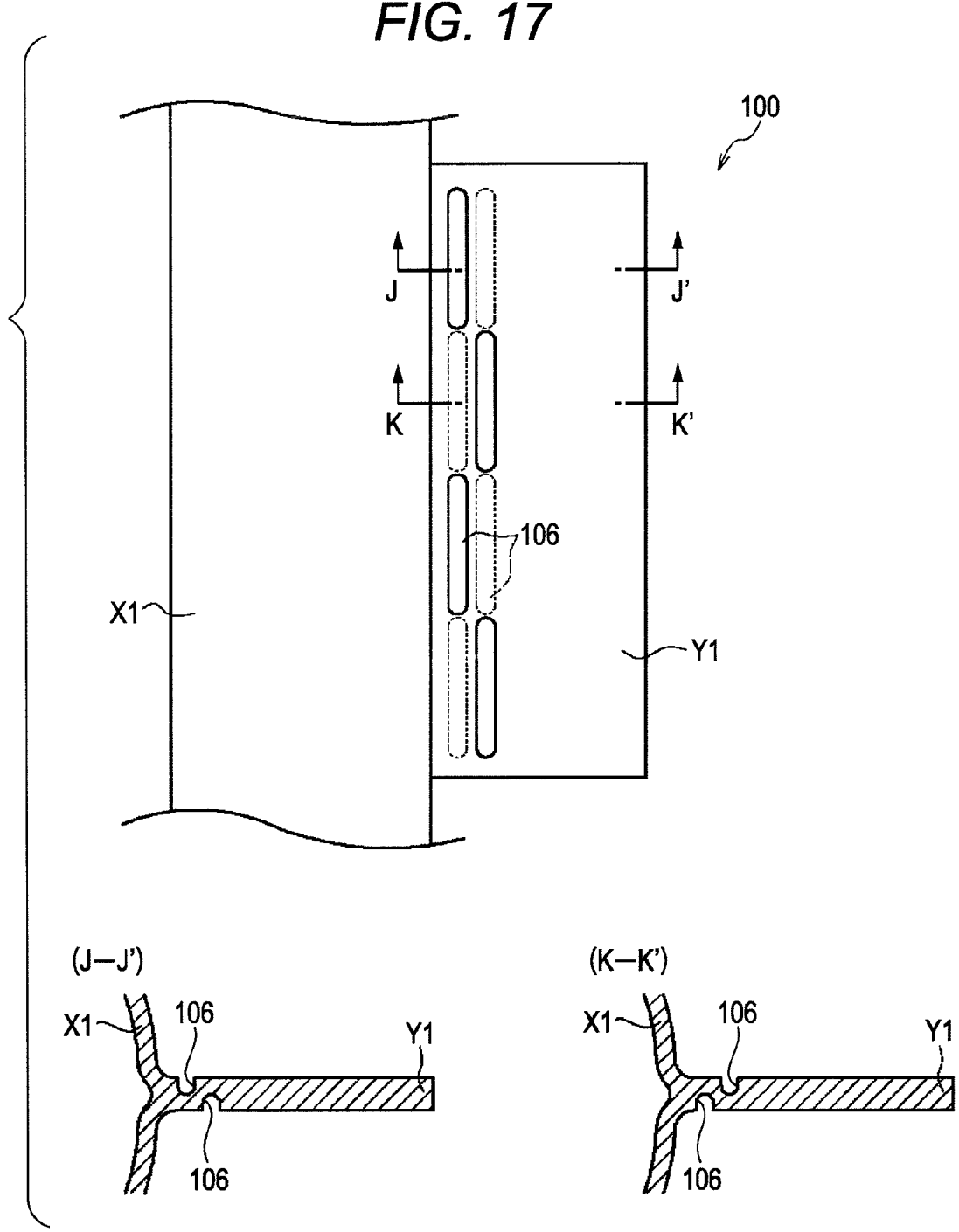
FIG. 17 is a schematic view for explaining further another example in which the recessed groove is formed on both surfaces of the plate portion.

FIG. 17 shows another example of formation of the recessed groove 106 of the plate portion Y1. In FIG. 17, the cross-sections taken along the line J-J' and the line H-H are cross-sections taken along the width direction of the recessed grooves 106 formed on both surfaces of the plate portion Y1. As shown in FIG. 17, the recessed grooves 106 formed in two lines may be alternately formed on one surface and the other surface along the joint surface between the tube body X1 and the plate portion Y1. In this case, as shown in FIG. 17, it is preferable to form the adjacent two lines of recessed grooves on different surfaces when the recessed grooves 106 formed in two lines are alternately formed on one surface and the other surface. Furthermore, the positional relationship between the recessed grooves formed on one surface and the recessed grooves formed on the other surface, which are alternately formed along the joint surface between the tube body X1 and the plate portion Y1, preferably satisfies the thickness relation of M3≤M1 as described above with reference to FIG. 14.

Thus, the formation of the recessed grooves 106 enables the foamed cells within the plate portion Y1 to be more reliably kept in the plate portion Y1 as in the configuration example shown in FIG. 16. At the same time, as in the configuration example shown in FIG. 14, the rigidity of the plate portion Y1 can be more increased with respect to the force applied from each direction.

The cross-sectional shapes of the recessed grooves 106 are not limited to those shown in FIGS. 9 and 14 to 17. The recessed grooves 106 may have any shape as long as each recessed groove can function as a dam with respect to the movement of the foamed cells upon clamping with the split mold blocks 12a and 12b.

The recessed groove 106 in the plate portion Y1 may be provided in any position depending on various design conditions as long as the recessed groove 106 is provided in the vicinity of the joint surface of the plate portion Y1 with the tube body X1.

In the embodiment described above, the recessed groove is formed in the vicinity of the joint surface of the plate portion Y1 with the tube body X1, as an example of the recess. However, the recess is not limited thereto, but various modifications can be made. For example, a dot-like recess may be formed in the vicinity of the joint surface of the plate portion Y1 with the tube body X1. The dot-like recess may be formed at one point. Alternatively, a plurality of dot-like recesses may be arranged to form a line along the joint surface at predetermined intervals. Such dot-like recesses can more effectively suppress the movement of the foams to the inside of the tube body X1.

Also in the case of forming the dot-like recess, by alternately forming the recesses on one surface and the other surface as described above, the rigidity can be improved as described above.

The plate portion Y1 having a recess formed therein has been described as a planar plate member in the embodiment described above. However, the shape of the plate portion Y1 is not limited to a plate-shape member having a flat surface, but may be any shape such as a shape obtained by folding the member in a complicated manner.

The cross-sectional shape of the tube body X1 is not limited to the cylindrical shape as illustrated in the embodiment described above, but may be any shape such as a rectangular shape with rounded corners.

Thus, the shape and configuration of the tubular molded foam 100 of this embodiment are not limited to those shown in FIGS. 1, 2 and the like, but can be changed as needed depending on various design conditions.

A tubular molded foam with a plate portion according to an embodiment of the present disclosure can be used for a variety of purposes such as ducts for air conditioners in transport machineries such as automobiles, trains, ships, and aircrafts.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

REFERENCE SIGNS LIST

100 Tubular molded foam
101 Tube portion
102 Fitting portion
103 Flange portion
104 Bridge portion
105 Supply port
106 Recessed groove (example of recess)
107 Fixing hole
10a, 10b Cavity surface
11 Annular dice
12a, 12b Split mold block
13 Foamed parison
14 Blow-in needle
15 Blow-out needle
16 Regulator
17 Backpressure regulator
18 Protrusion
A, B, C, F Channel Direction
20 Hydraulic motor
21 Hopper 22 Cylinder
24 Accumulator
26 Plunger
28 T-die
29 Die bolt
30 Adjustment roller
50 Extruding device
X1 Tube body
Y1 Plate portion
Z Pressing force generated due to clamping

What is claimed is:

1. A tubular foam molding with a plate-shaped portion, the tubular foam molding comprising:
   a tube main body, the plate-shaped portion connected to an outside of the tube main body,
   wherein the tubular foam molding is molded by sandwiching molten foam resin between mold halves,
   wherein, in the molding, a concave portion for preventing movement of a foam cell inside the plate-shaped portion toward the tube main body is formed near a connection of the plate-shaped portion to the tube main body,
   wherein the movement of the foam cell inside the plate-shaped portion toward the tube main body is dammed up in a point where the concave portion is formed,
   wherein a thickness of the concave portion is smaller than a thickness of the plate-shaped portion, the plate-shaped portion being uniform in thickness, and
   wherein the plate-shaped portion includes at least one hole for the attachment of a tubular body.

2. The tubular foam molding with a plate-shaped portion according to claim 1, wherein the concave portion is a concave groove formed by a convex portion provided on the mold half, at a time of molding the tubular foam molding by sandwiching the foam resin by the mold halves.

3. The tubular foam molding with a plate-shaped portion according to claim 1, wherein the concave portion is formed to have a form corresponding to the connection surface of the plate-shaped portion to the tube main body.

4. The tubular foam molding with a plate-shaped portion according to claim 1, wherein the concave portion is not formed near an end portion of the plate-shaped portion, and the plate-shaped portion has a predetermined structural strength.

5. The tubular foam molding with a plate-shaped portion according claim 1,
   wherein the tube main body includes an engaging portion that connects another tubular member inside,
   wherein the plate-shaped portion is connected to an outside of a portion including at least a part of the engaging portion of the tube main body, and
   wherein the concave portion is formed at a portion including at least a portion near a connection surface of the plate-shaped portion to the engaging portion.

6. The tubular foam molding with a plate-shaped portion according to claim 1, wherein concave portions are alternately formed on one surface and another surface of the plate-shaped portion into forms along the connection surface to the tube main body.

7. A method of molding a tubular foam molding including a tube main body and a plate-shaped portion connected to outside of the tube main body, the method comprising:
   molding the tubular foam molding by sandwiching molten foam resin between mold halves; and
   in the molding, forming a concave portion for preventing movement of a foam cell inside the plate-shaped portion toward the tube main body, near a connection surface of the plate-shaped portion to the tube main body,
   wherein the movement of the foam cell inside the plate-shaped portion toward the tube main body is dammed up in a point where the concave portion is formed,
   wherein a thickness of the concave portion is smaller than a thickness of the plate-shaped portion, the plate-shaped portion being uniform in thickness, and
   wherein the plate-shaped portion includes at least one hole for the attachment of a tubular body.

8. The method of molding a tubular foam molding according to claim 7, wherein the concave portion corresponds to a form of a convex portion provided to the mold half, at a time of molding the tubular foam molding by sandwiching the foam resin by the mold halves.

9. The tubular foam molding with a plate-shaped portion according to claim 2, wherein the concave portion is formed to have a form corresponding to the connection surface of the plate-shaped portion to the tube main body.

10. The tubular foam molding with a plate-shaped portion according to claim 2, wherein the concave portion is not formed near an end portion of the plate-shaped portion, and the plate-shaped portion has a predetermined structural strength.

11. The tubular foam molding with a plate-shaped portion according to claim 3, wherein the concave portion is not formed near an end portion of the plate-shaped portion, and the plate-shaped portion has a predetermined structural strength.

12. The tubular foam molding with a plate-shaped portion according claim 2,
    wherein the tube main body includes an engaging portion that connects another tubular member inside,
    wherein the plate-shaped portion is connected to an outside of a portion including at least a part of the engaging portion of the tube main body, and
    wherein the concave portion is formed at a portion including at least a portion near a connection surface of the plate-shaped portion to the engaging portion.

13. The tubular foam molding with a plate-shaped portion according claim 3,
    wherein the tube main body includes an engaging portion that connects another tubular member inside,
    wherein the plate-shaped portion is connected to an outside of a portion including at least a part of the engaging portion of the tube main body, and
    wherein the concave portion is formed at a portion including at least a portion near a connection surface of the plate-shaped portion to the engaging portion.

14. The tubular foam molding with a plate-shaped portion according claim 4,
    wherein the tube main body includes an engaging portion that connects another tubular member inside,
    wherein the plate-shaped portion is connected to an outside of a portion including at least a part of the engaging portion of the tube main body, and
    wherein the concave portion is formed at a portion including at least a portion near a connection surface of the plate-shaped portion to the engaging portion.

15. The tubular foam molding with a plate-shaped portion according to claim 2, wherein concave portions are alternately formed on one surface and another surface of the plate-shaped portion into forms along the connection surface to the tube main body.

16. The tubular foam molding with a plate-shaped portion according to claim 3, wherein concave portions are alternately formed on one surface and another surface of the plate-shaped portion into forms along the connection surface to the tube main body.

17. The tubular foam molding with a plate-shaped portion according to claim 4, wherein concave portions are alternately formed on one surface and another surface of the plate-shaped portion into forms along the connection surface to the tube main body.

18. The tubular foam molding with a plate-shaped portion according to claim 5, wherein concave portions are alternately formed on one surface and another surface of the plate-shaped portion into forms along the connection surface to the tube main body.

\* \* \* \* \*